US012166293B2

(12) United States Patent
Oh et al.

(10) Patent No.: US 12,166,293 B2
(45) Date of Patent: Dec. 10, 2024

(54) ELECTRONIC DEVICE INCLUDING ANTENNA AND METHOD OF MANUFACTURING THE ELECTRONIC DEVICE

(71) Applicant: Samsung Electronics Co., Ltd., Gyeonggi-do (KR)

(72) Inventors: Chanhee Oh, Gyeonggi-do (KR); Kyuyoung Kim, Gyeonggi-do (KR); Sungsoo Kim, Gyeonggi-do (KR); Hyunju Hong, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 259 days.

(21) Appl. No.: 17/846,426

(22) Filed: Jun. 22, 2022

(65) Prior Publication Data

US 2022/0320737 A1    Oct. 6, 2022

Related U.S. Application Data

(63) Continuation of application No. PCT/KR2021/018491, filed on Dec. 7, 2021.

(30) Foreign Application Priority Data

Dec. 7, 2020    (KR) ........................ 10-2020-0169763

(51) Int. Cl.
*H01Q 9/04*    (2006.01)
*H04M 1/02*    (2006.01)

(52) U.S. Cl.
CPC ......... *H01Q 9/0421* (2013.01); *H01Q 9/0485* (2013.01); *H04M 1/0266* (2013.01)

(58) Field of Classification Search
None
See application file for complete search history.

(56) References Cited

U.S. PATENT DOCUMENTS

| | | | |
|---|---|---|---|
| 6,809,689 | B1 | 10/2004 | Chen |
| 6,888,502 | B2 | 5/2005 | Beigel et al. |
| 10,093,202 | B2 | 10/2018 | Fujita et al. |
| 2003/0169207 | A1 | 9/2003 | Beigel |

(Continued)

FOREIGN PATENT DOCUMENTS

| | | |
|---|---|---|
| CN | 109390677 A | 2/2019 |
| CN | 111146582 A | 5/2020 |

(Continued)

OTHER PUBLICATIONS

Moon-Kyou Kang et al.; "Fabrication and Analysis of Multiple U-shaped slot Microstrip Antenna in 5GHz band"; Journal of IKEEE vol. 8. No. 1; 10 pages.

*Primary Examiner* — Wilson Lee
(74) *Attorney, Agent, or Firm* — Cha & Reiter, LLC

(57) ABSTRACT

According to certain embodiments, an electronic device includes a display configured to output visual information to the front of the electronic device, a support structure configured to support at least one of electronic components accommodated in the electronic device, the support structure having a first surface and a second surface, and an antenna including a ground portion disposed on the first surface and a radiation portion disposed on the second surface that are disposed respectively on both surfaces of the support structure.

20 Claims, 15 Drawing Sheets

(56) References Cited

U.S. PATENT DOCUMENTS

| | | | | |
|---|---|---|---|---|
| 2021/0168230 A1* | 6/2021 | Baker | .................. | G06F 1/1698 |
| 2022/0103668 A1* | 3/2022 | Kim | ........................ | H04M 1/0214 |
| 2022/0311127 A1* | 9/2022 | Li | ............................ | H01Q 5/28 |
| 2022/0393349 A1* | 12/2022 | Lee | ...................... | H04B 7/0413 |
| 2022/0393705 A1* | 12/2022 | Lee | ...................... | H04B 1/0064 |
| 2023/0000633 A1* | 1/2023 | Dalla Pria | ........... | A61F 2/30734 |

FOREIGN PATENT DOCUMENTS

| | | |
|---|---|---|
| JP | 2004-260582 A | 9/2004 |
| JP | 5786559 B2 | 9/2015 |
| JP | 2020-72436 A | 5/2020 |
| KR | 20-0385306 | 5/2005 |
| KR | 10-0586038 B1 | 6/2006 |
| KR | 10-0878707 B1 | 1/2009 |
| KR | 10-0993439 B1 | 11/2010 |
| KR | 10-2012-0020088 A | 3/2012 |
| KR | 10-2013-0051054 A | 5/2013 |
| KR | 10-1887934 B1 | 9/2018 |
| KR | 10-2019-0061795 A | 6/2019 |

\* cited by examiner

ELECTRONIC DEVICE INCLUDING ANTENNA AND METHOD OF MANUFACTURING THE ELECTRONIC DEVICE

CROSS-REFERENCE TO RELATED APPLICATIONS

This application is a Continuation of International Application No. PCT/KR2021/018491 designating the United States, filed on Dec. 7, 2021, in the Korean Intellectual Property Receiving Office and claiming priority to Korean Patent Application No. 10-2020-0169763, filed on Dec. 7, 2020, in the Korean Intellectual Property Office, the disclosures of which are incorporated by reference herein in their entireties.

BACKGROUND

1. Field

The disclosure relates to an electronic device including an antenna and a method of manufacturing the electronic device.

2. Description of Related Art

The development of electronic technology has accelerated the development and distribution of electronic products of various types. Among these, electronic devices having various functions, for example, smartphones, tablet personal computers (PCs), and wearable devices, have been in increasing use.

By accessing a network, a user may access a greater amount of information and functionality, than the functions (e.g., applications) or information embedded in an electronic device itself a user can directly access a network using a wired connection (e.g., wired communication) that provides a fast and stable communication establishment. However, a wired connection is limited in space to the vicinity of the connection point. In contrast, wireless communications allows the user to access the network in a greater area. Moreover, the transmission speed and stability of wireless communication has gradually become just as fast as wired communication. The wireless communications are thus expected to increase in usage.

Wireless communication can access a network using an antenna. Accordingly, it important to place the antenna in the electronic device in a way that is space efficient.

SUMMARY

According to certain embodiments, an electronic device includes a display configured to output visual information to the front of the electronic device, a support structure configured to support at least one of electronic components accommodated in the electronic device, the support structure having a first surface and a second surface, and an antenna including a ground portion disposed on the first surface and a radiation portion disposed on the second surface that are disposed respectively on both surfaces of the support structure.

The electronic device may further include a rear housing configured to surround a rear outer surface of the electronic device. The support structure may include a printed circuit board (PCB) configured to support the at least one electronic component, and a rear frame disposed between the PCB and the rear housing. The radiation portion may include at least one patch plate disposed on a rear surface of the rear frame, the second surface comprising the rear surface of the rear frame and the ground portion may include at least one ground electrode disposed on a front surface of the rear frame and overlapping the at least one patch plate in a front-rear direction, the first surface comprising the front surface of the rear frame.

The antenna may further include a dielectric disposed between the ground portion and the radiation portion without overlapping the at least one patch plate in the front-rear direction.

The ground portion may be disposed on a front surface of a rear frame disposed at a rearmost position of the support structure based on the front-rear direction crossing the front and the rear of the electronic device, the first surface comprising the front surface of the rear frame, and the radiation portion may be disposed on a rear surface of the rear frame, the second surface comprising the rear surface of the rear frame.

The support structure may include a front frame configured to support the display and a rear frame disposed behind the front frame, and the ground portion may be disposed on a front surface of the rear frame, the first surface comprising the front surface of the rear frame, and the radiation portion may be disposed on a rear surface of the rear frame, the second surface comprising the rear surface of the rear frame.

The antenna may further include a dielectric disposed between the ground portion and the radiation portion, and a first portion of the radiation portion may cover the dielectric and a second portion of the radiation portion may cover a portion of the rear frame.

A permittivity of the dielectric may be less than that of the rear frame, and a strength of the rear frame may be greater than that of the dielectric.

Between the front frame and the rear frame, a space in which the at least one electronic component is to be disposed may be formed. The at least one electronic component may overlap the antenna in the front-rear direction and be disposed opposite to the radiation portion.

The rear frame may include a protruding portion and/or a recessed portion configured to support another component adjacent to the front surface or the rear surface of the rear frame restricting a relative movement of the other component with respect to the rear frame is reduced, and a seating portion on which the antenna is seated. Of the seating portion, an area overlapping the radiation portion of the antenna in the front-rear direction may be flat.

The antenna may further include a dielectric disposed between the ground portion and the radiation portion, and the radiation portion may include a first portion overlapping the dielectric in the front-rear direction and a second portion overlapping the seating portion in the front-rear direction. The first portion and the second portion of the radiation portion may be integrated.

The electronic device may further include a PCB disposed between the front frame and the rear frame, on which the at least one electronic component is mounted. The rear frame may further include a connecting hole disposed adjacent to the seating portion and configured to pass through the rear frame in the front-rear direction. The antenna may be physically and electrically connected to the PCB through the connecting hole.

A surface of at least a portion of an outer surface of the dielectric may be disposed to face an inner wall of the connecting hole.

A strength of the dielectric may be less than that of the seating portion, and power may be fed from the PCB to the radiation portion through a via hole formed in the dielectric.

The antenna may include a head in which an antenna connector connected to the PCB is disposed, a body in which a patch plate of the radiation portion is disposed, and a neck disposed between the head and the body and having a width less than that of the body.

The ground portion may include a ground head disposed on a front surface of the head, a ground neck disposed on a front surface of the neck, and a ground body disposed on a front surface of the body. The ground neck may include at least one perforated portion that is elongated in a longitudinal direction without overlapping a signal line disposed on a rear surface of the neck in the front-rear direction.

The antenna may further include a signal line configured to supply power or a signal from the antenna connector to the radiation portion. Of the signal line, a width of a first signal line disposed on a neck side based on a boundary between the neck and the body may be less than that of a second signal line disposed on a body side based on the boundary between the neck and the body.

The radiation portion may include a first patch plate disposed on the rear surface of the rear frame, a second patch plate spaced apart from the first patch plate in a first direction on the rear surface of the rear frame, and a third patch plate spaced apart from the first patch plate in a second direction on the rear surface of the rear frame. A center of the first patch plate, a center of the second patch plate, and a center of the third patch plate may not be disposed on a straight line.

A thickness of the dielectric may be 90% to 110% of a thickness of the rear frame.

A first portion of the ground portion may cover the dielectric, and a second portion of the ground portion may cover a portion of the seating portion. The first portion and the second portion of the ground portion may be provided in an integral form.

The ground portion may include a first ground portion disposed on a front surface of the dielectric and a second ground portion disposed on a front surface of the seating portion without being in contact with the first ground portion.

According to certain embodiments, an electronic device includes a housing defining an exterior of the electronic device, a display configured to output visual information to the front of the electronic device, a support structure configured to support at least one of electronic components accommodated in the electronic device, and an antenna disposed inside the housing and configured to use at least a portion of the support structure as a substrate.

According to certain embodiments, a method of manufacturing an electronic device including a support structure configured to support at least one of electronic components accommodated in the electronic device and an antenna including a ground portion and a radiation portion, the method includes installing the ground portion on a first surface of the support structure and installing the radiation portion on the second surface of the support structure.

The method may further include providing a primary antenna before the installing of the radiation portion on the second surface of the support structure and the installing of the ground portion on the first surface of the support structure. The providing of the primary antenna may include installing the ground portion having a larger area than a dielectric on a first surface of the dielectric and radiation portion on a second surface of the dielectric, installing an adhesive layer having a release paper in a portion of the radiation portion that is not in contact with the dielectric, and installing an adhesive layer having a release paper in a portion of the ground portion that is not in contact with the dielectric.

The method may further include providing a primary antenna before the installing of the radiation portion on the one surface of the support structure and the installing of the ground portion on the other surface of the support structure. The ground portion may include a first ground portion and a second ground portion that are not in contact with each other. The providing of the primary antenna may include installing the radiation portion having a larger area than a dielectric on the second surface of the dielectric, installing the first ground portion on the first surface of the dielectric, and installing an adhesive layer having a release paper in a portion of the radiation portion that is not in contact with the dielectric. The installing of the ground portion on the first surface of the support structure may include installing the second ground portion on the other surface of the support structure, and the installing of the second ground portion may be performed before the installing of the radiation portion.

According to various example embodiments described herein, disposing a ground portion and a radiation portion of an antenna on both sides of a support structure of an electronic device and using the support structure as a substrate of the antenna may improve the efficiency of a mounting space for the antenna and/or improve the radiation efficiency of the antenna.

Other features and aspects will be apparent from the following detailed description, the drawings, and the claims.

DETAILED DESCRIPTION

Figure 1:
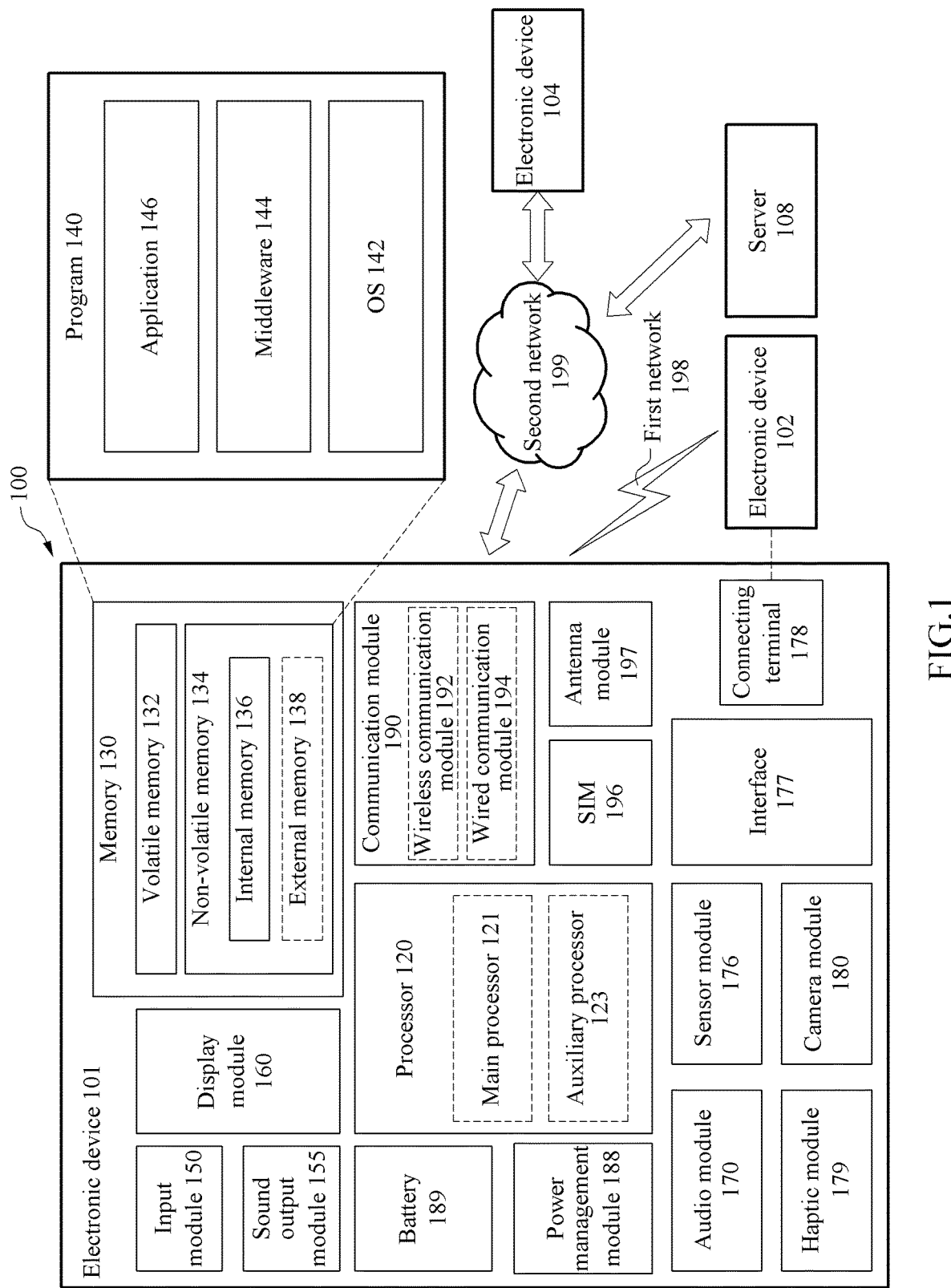
FIG. 1 is a block diagram illustrating an example electronic device in a network environment according to certain embodiments.

Hereinafter, certain embodiments will be described in greater detail with reference to the accompanying drawings. When describing the example embodiments with reference to the accompanying drawings, like reference numerals refer to like elements and a repeated description related thereto will be omitted. Throughout the disclosure, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

For data transmission and reception, antennas of various types may be provided in electronic devices, for improving user convenience. For example, an electronic device can include numerous antennas. The antennas may include antennas for bidirectional communication with a cellular communication network, wireless local area network (WLAN), antennas to engage in near-field communication (NFC), broadcasting, antennas to access a global navigation satellite system (GNSS), as well as an antennas for receiving wireless power.

According to certain embodiments, an electronic device including an antenna and a method of manufacturing the electronic device may be provided.

According to certain embodiments, the efficiency of a mounting space for an antenna may be improved.

According to certain embodiments, the radiation efficiency of an antenna may be improved.

Electronic Device

Figure 2:
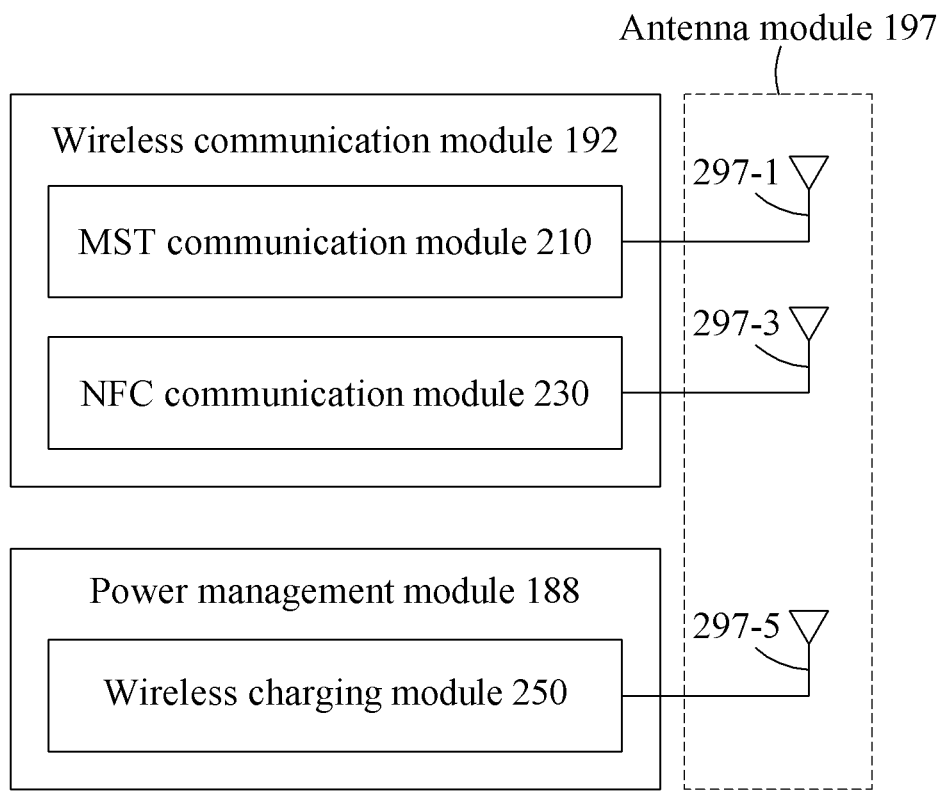
FIG. 2 is a block diagram illustrating an electronic device including a wireless communication module, a power management module, and an antenna module according to certain embodiments.

FIG. 1 is a block diagram of an electronic device 101 with an antenna module 197 for accessing numerous networks, and engaging in various types of communication. FIG. 2 describes the wireless communication module 192, power management module 188, and antenna module 197.

Referring to FIG. 1, an electronic device 101 in a network environment 100 may communicate with an electronic device 102 via a first network 198 (e.g., a short-range wireless communication network, such as a WLAN), or communicate with at least one of an electronic device 104 and a server 108 via a second network 199 (e.g., a long-range wireless communication network, such as a cellular network). The electronic device 101 may communicate with the electronic device 104 via the server 108. The electronic device 101 may access the first network 198 or the second network 199 using antenna module 197.

The electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. At least one (e.g., the connecting terminal 178) of the above components may be omitted from the electronic device 101, or one or more other components may be added in the electronic device 101. Some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. As used herein, the term "processor" shall be understood to refer to both the singular and plural contexts. As at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. The processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application).

The auxiliary processor 123 (e.g., an ISP or a CP) may be implemented as a portion of another component (e.g., the camera module 180 or the communication module 190) that is functionally related to the auxiliary processor 123. The auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. The receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. The display module 160 may include a touch sensor adapted to sense a touch, or a pressure sensor adapted to measure an intensity of a force incurred by the touch.

The audio module 170 may convert a sound into an electric signal or vice versa. The audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. The interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). The connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. The haptic module 179 may include, for example, a motor, a piezoelectric element, or an electric stimulator.

The camera module 180 may capture a still image and moving images. The camera module 180 may include one or more lenses, image sensors, ISPs, or flashes.

The power management module 188 may manage power supplied to the electronic device 101. The power management module 188 may be implemented as, for example, at least a part of a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to certain embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. The antenna module 197 may include one or more antennas including a radiating element having conductive material or a conductive pattern formed in or on a substrate (e.g., a printed circuit board (PCB)). The antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. Another component (e.g., a radio frequency integrated circuit (RFIC)) other than the radiating element may be additionally formed as a part of the antenna module 197.

The antenna module 197 may form a mmWave antenna module. The mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 and 104 may be a device of the same type as or a different type from the electronic device 101. All or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. The external electronic device 104 may include an Internet-of-things (IoT) device. The server 108 may be an intelligent server using machine learning and/or a neural network. According to certain embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

As can be seen, the antenna module 197 includes numerous antennas to access a variety of networks. FIG. 2 describes the wireless communication module 192, the power management module 188 and antenna module 197.

Antennas

FIG. 2 is a block diagram illustrating an electronic device including a wireless communication module, a power management module, and an antenna module according to various example embodiments.

Referring to FIG. 2, the wireless communication module 192 may include a magnetic secure transmission (MST) communication module 210 or a near-field communication (NFC) communication module 230, and the power management module 188 may include a wireless charging module 250. In this case, the antenna module 197 may include a plurality of antennas including an MST antenna 297-1 connected to the MST communication module 210, an NFC antenna 297-3 connected to the NFC communication module 230, and a wireless charging antenna 297-5 connected to the wireless charging module 250. For the convenience of description, components already described above with reference to FIG. 1 will not be described again or be briefly described here.

The MST communication module 210 may receive a signal including control information or payment information such as card information from the processor 120, and generate a magnetic signal corresponding to the received signal and then transmit the generated magnetic signal to the external electronic device 102 (e.g., a point of sale (POS) device) through the MST antenna 297-1. To generate the magnetic signal, the MST communication module 210 may include a switching module (not shown) including one or more switches connected to the MST antenna 297-1, and control the switching module to change a direction of a voltage or current to be supplied to the MST antenna 297-1 based on the received signal. As the direction of the voltage or current changes, a direction of the magnetic signal (e.g., a magnetic field) to be transmitted through the MST antenna 297-1 may change accordingly. When the magnetic signal of which the direction changes is detected by the external electronic device 102, a similar effect (e.g., a waveform) to a magnetic field generated as a magnetic card corresponding to the received signal (e.g., card information) is swiped over a card reader of the electronic device 102 may be generated. The payment information and control information received in the form of the magnetic signal by the electronic device 102 may be transmitted to the external server 108 (e.g., a payment server) through the network 199, for example.

The NFC communication module 230 may obtain a signal including control information or payment information such as card information from the processor 120, and transmit the obtained signal to the external electronic device 102 through the NFC antenna 297-3. According to certain embodiments, the NFC communication module 230 may receive such a signal transmitted from the external electronic device 102 through the NFC antenna 297-3.

The wireless charging module 250 may wirelessly transmit power to the external electronic device 102 (e.g., a mobile phone or a wearable device) through the wireless charging antenna 297-5, or wirelessly receive power from the external electronic device 102 (e.g., a wireless charging device). The wireless charging module 250 may support one or more of various wireless charging methods including, for example, a magnetic resonance method or a magnetic induction method.

According to certain embodiments, some of the MST antenna 297-1, the NFC antenna 297-3, and the wireless charging antenna 297-5 may share at least a portion of a radiation portion with each other. For example, a radiation portion of the MST antenna 297-1 may be used as a radiation portion of the NFC antenna 297-3 or the wireless charging antenna 297-5, and vice versa. In this example, the antenna module 197 may include a switching circuit (not shown) set to selectively connect (or close) or disconnect (or open) at least a portion of the antennas 297-1, 297-3, and 297-5 under the control of the wireless communication module 192 (e.g., the MST communication module 210 or the NFC communication module 230) or the power management module 188 (e.g., the wireless charging module 250). For example, when the electronic device 101 uses a wireless charging function, the NFC communication module 230 or the wireless charging module 250 may control the switching circuit to temporarily disconnect at least a portion of the radiation portion shared by the NFC antenna 297-3 and the wireless charging antenna 297-5 from the NFC antenna 297-3 and connect it to the wireless charging antenna 297-5.

At least one of functions of the MST communication module 210, the NFC communication module 230, or the wireless charging module 250 may be controlled by an external processor (e.g., the processor 120). Preset functions (e.g., a payment function) of the MST communication module 210 or the NFC communication module 230 may be performed in a trusted execution environment (TEE). The TEE may establish an execution environment to which at least some preset areas of the memory 130 are allocated to perform functions (e.g., financial transaction or personal information related functions) that require a relatively high level of security. In this case, access to the preset areas may be restrictively allowed according to, for example, a subject accessing the areas or an application executed in the TEE.

An electronic device may be a device of one of various types. The electronic device may include, as non-limiting examples, a portable communication device (e.g., a smartphone, etc.), a computing device, a portable multimedia device, a portable medical device, a camera, a wearable device, or a home appliance. However, the electronic device is not limited to the foregoing examples.

It should be construed that certain embodiments of the present disclosure and the terms used therein are not intended to limit the technological features set forth herein to some particular embodiments but include various changes, equivalents, or replacements of the example embodiments. In connection with the description of the drawings, like reference numerals may be used for similar or related components. It should be understood that a singular form of a noun corresponding to an item may include one or more of the things, unless the relevant context clearly indicates otherwise. As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof. Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure. It should also be understood that, when a component (e.g., a first component) is referred to as being "connected to" or "coupled to" another component with or without the term "functionally" or "communicatively," the component can be connected or coupled to the other component directly (e.g., wiredly), wirelessly, or via a third component.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to certain embodiments, the module may be implemented in the form of an application-specific integrated circuit (ASIC).

Certain embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to certain embodiments, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. One or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3A:
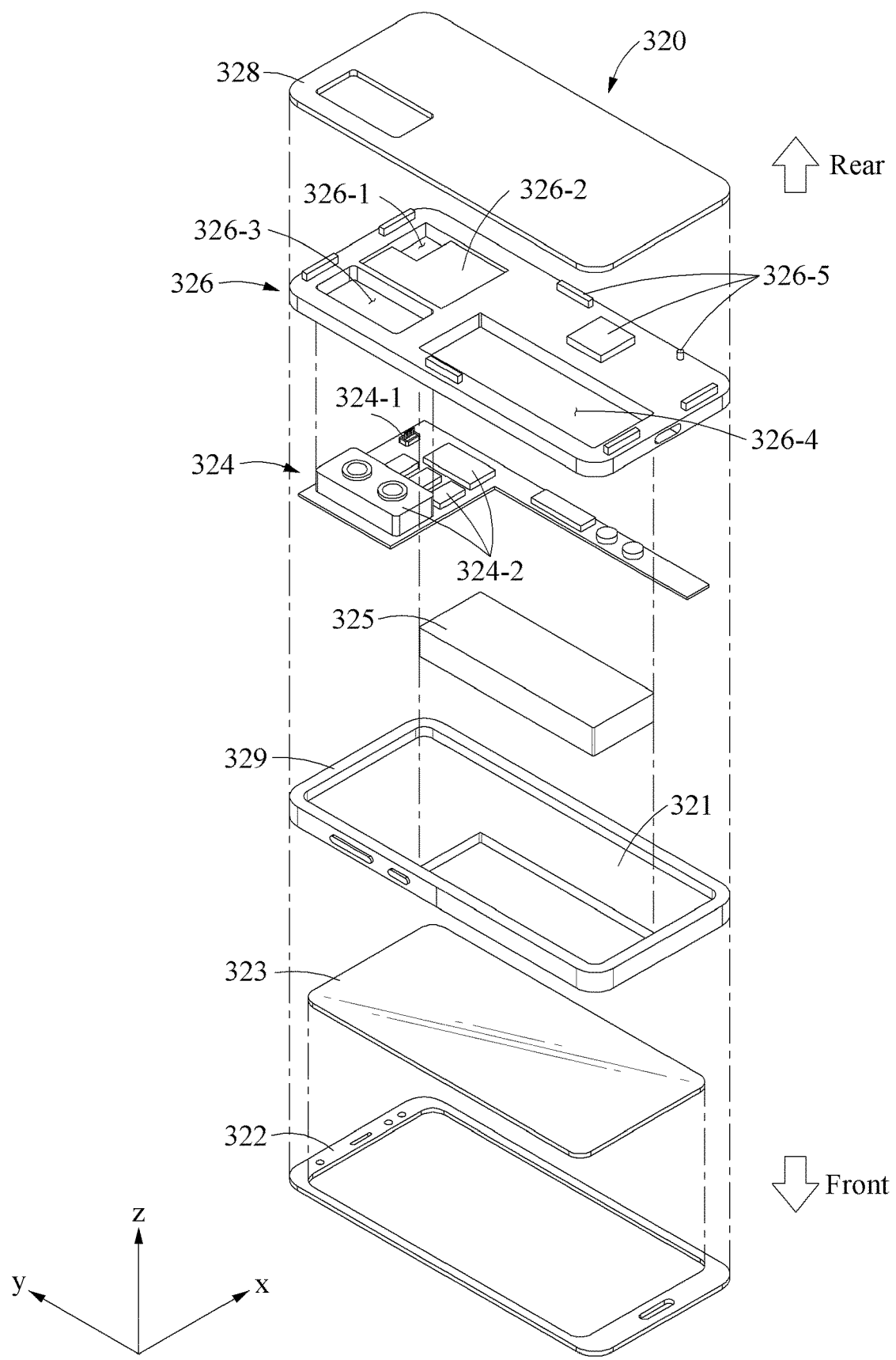
FIG. 3A is an exploded perspective view of an electronic device with an antenna omitted according to certain embodiments.
Figure 3B:
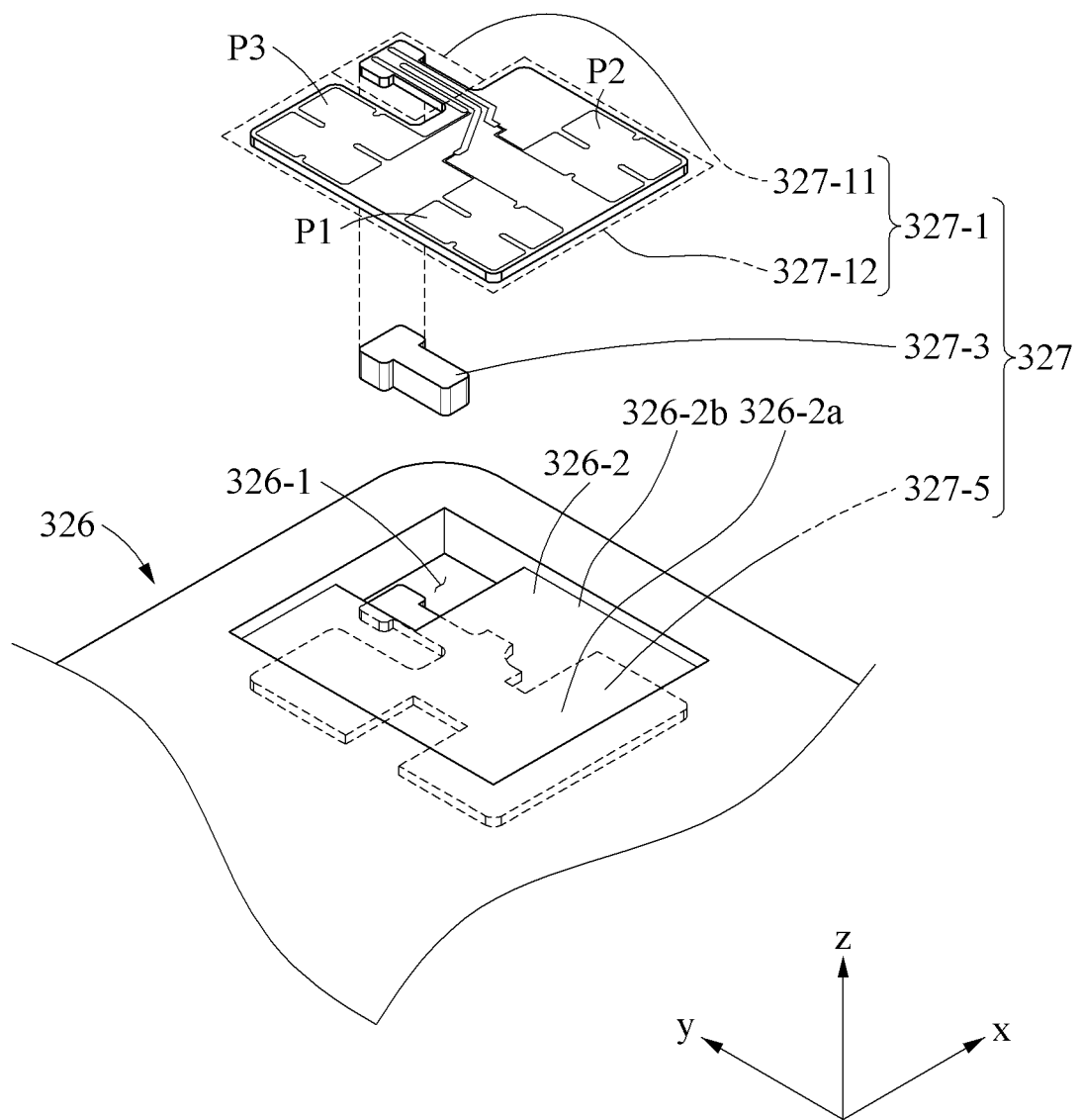
FIG. 3B is an exploded perspective view of a seating portion of a rear frame and an antenna according to certain embodiments.
Figure 3C:
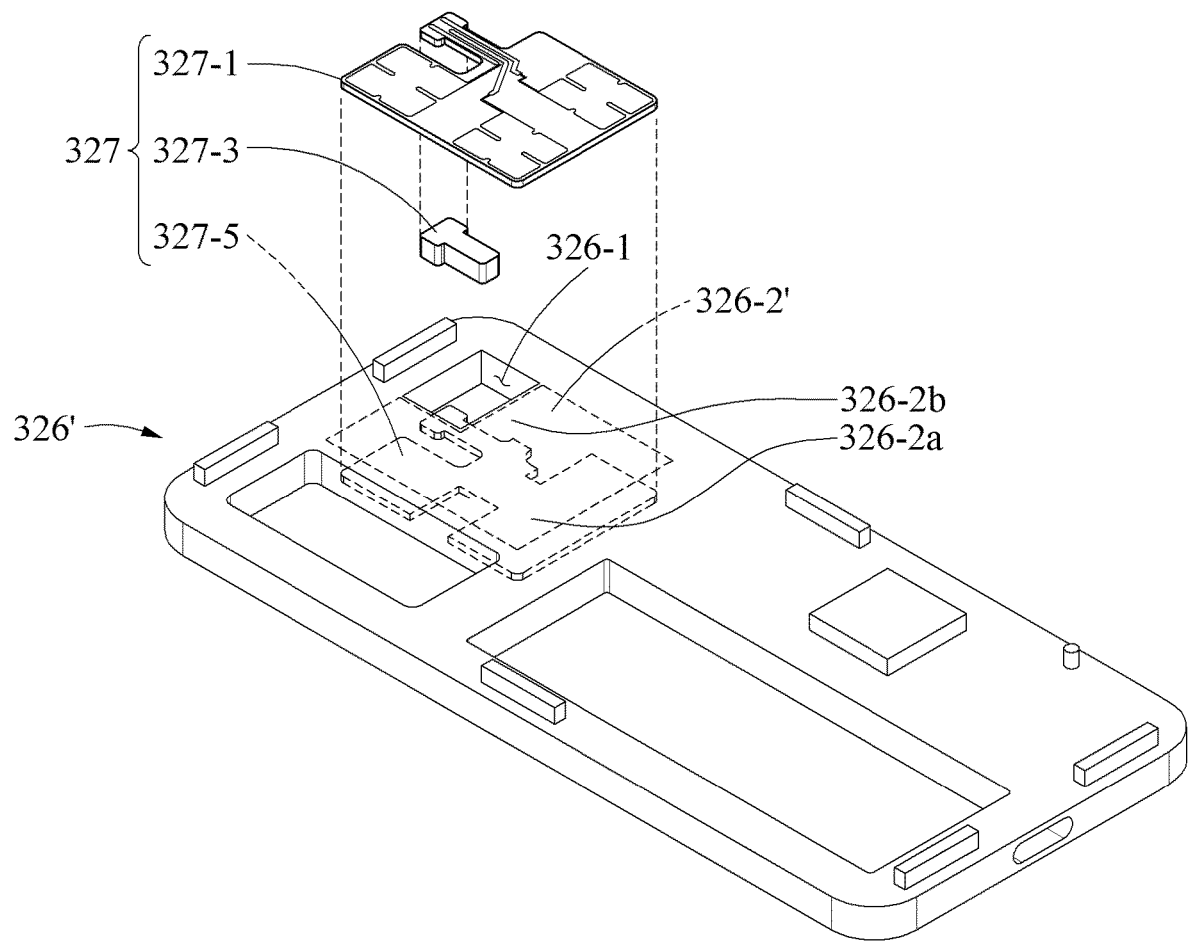
FIG. 3C is an exploded perspective view of a rear frame and an antenna according to certain embodiments.

FIG. 3A is an exploded perspective view of an electronic device with an antenna omitted according to various example embodiments, FIG. 3B is an exploded perspective view of a seating portion of a rear frame and an antenna according to various example embodiments, and FIG. 3C is an exploded perspective view of a rear frame and an antenna according to various example embodiments.

The electronic device 320 includes a front housing 322, a rear housing 328, and a side housing surrounding the space between the front housing 322 and the rear housing 328. Supports structures 321, 324, and 326, and battery 325 are disposed within the housing. A display 323 can be disposed under the front housing 322 so as to be visible through the front housing 322. An antenna 327 can include a radiation portion 327-1 and ground portion 327-5. The radiation portion 327-1 and the ground portion 327-5 can be connected to different surfaces of the support structures 321, 324, and 326.

As shown in FIG. 3B, the support structures can include a rear frame 326. The rear frame 326 can include a first surface (e.g., the +z side) and a second surface (e.g., the −z side) that is opposite of the first surface. It is noted that, alternatively, the first surface can be the −z side and the second surface can be the +z side.

Referring to FIGS. 3A through 3C, an electronic device 320 (e.g., the electronic device 101 of FIG. 1) may include housings 322, 328, and 329, one or more support structures 321, 324, and 326, a display 323, a battery 325.

The housings 322, 328, and 329 may form an exterior of the electronic device 320. The housings 322, 328, and 329 may include a front housing 322 (e.g., a front cover glass) surrounding a front outer surface of the electronic device 320, a side housing 329 (e.g., a bezel frame) surrounding lateral edges of the electronic device 320, and a rear housing 328 (e.g., a rear cover glass) surrounding a rear outer surface of the electronic device 320.

Although the housings 322, 328, and 329 are illustrated in FIG. 3A as being divided into three parts that cover the front, side, and rear, respectively, examples of which are not limited to the illustrated example. For example, the side housing 329 may be provided in an integral form with the front housing 322 or the rear housing 329. Alternatively, the front housing 322 and the rear housing 328 may be coupled to each other without a separate side housing (e.g., the side housing 329) to form the entire exterior of the electronic device 320. Alternatively, the housings 322, 328, and 329 may be formed in different directions and numbers, for example, as two housings divided into upper and lower portions. Unless otherwise stated, the front, side, and rear merely refer to portions in which the respective housings 322, 328, and 329 are disposed with respect to the electronic device 320, and detailed descriptions thereof will be omitted.

The rear housing 328 may be provided in a structure that surrounds the rear outer surface of the electronic device 320 According to various example embodiments, the overlapping portion may be construed as an overlapping portion when viewed from one direction.

The support structures 321, 324, and 326 may be disposed inside the housings 322, 328, and 329, and support at least one of electronic components 323, 324, and 325 accommodated in the electronic device 320. A radiation portion 327-1 of the antenna 327 may be disposed abutting the rear housing 328 so not to be directly exposed to the outside. The foregoing prevents or reduces potential damage to the radiation portion 327-1 by external impact. For example, a portion of the rear housing 328 that overlaps the radiation portion 327-1 in a front-rear direction (e.g., a z-axis direction) may be formed of a material that is not a conductor, and may thus prevent or reduce a loss of a gain of radio waves transmitted from the radiation portion 327-1.

The radiation portion 327-1 and a ground portion 327-5 of the antenna 327 may be disposed on two different surfaces (a first surface and a second surface) of the support structures 321, 324, and 326, respectively. Such a structure may enable the utilization of the support structures 321, 324, and 326 provided for required functions in the electronic device 320 as a substrate of the antenna 327, and may thus improve the efficiency of a mounting space. In addition, the support structures 321, 324, and 326 may generally have a sufficient thickness to secure the rigidity of the electronic device 320, and the thickness of the substrate of the antenna 327 may also be improved, thereby improving the radiation efficiency of the antenna 327.

For example, the support structures 321, 324, 326 may include a first frame 321 (e.g., a front frame) for supporting the display 323, a printed circuit board (PCB) 324, and a second frame 326 (e.g., a rear frame). Although the support structures 321, 324, and 326 are described as including the two frames 321 and 326, any one of the frames 321 and 326 may be omitted or an additional frame may be further provided. When a direction crossing the front and rear surfaces of the electronic device 320 is referred to as a "front-rear direction," a structure (e.g., the first frame 321) disposed at a foremost position among the support structures 321, 324, and 326 may be referred to as a "front frame" with respect to the front-rear direction and a structure (e.g., the second frame 326) disposed at a rearmost position among the support structures 321, 324, and 326 may be referred to as a "rear frame" with respect to the front-rear direction. However, for example, when the support structures 321, 324, and 326 include one frame, the one frame may be referred to as a "rear frame" in that it is disposed behind the display 323.

Hereinafter, a case in which the antenna 327 is installed in the rear frame 326 will be described by way of example, and not limitation. Unless otherwise stated, it should be understood herein that the antenna 327 may also be installed in other support structures 321 and 324, not in the rear frame 326, and a detailed description thereof will be omitted.

The display 323 may output visual information (e.g., a text, an image, a video, etc.) and provide the visual information to a user through the front housing 322.

The front frame 321 may support the display 323 from behind the front housing 322 toward the front housing 322. For example, the rigidity of the front frame 321 may be greater than that of the housings 322, 328, and 329. Such a structure may reduce an overall deformation of the electronic device 320 by using the front frame 321 while facilitating a relatively wide selection of a material of the housings 322, 328, and 329. For example, as illustrated in FIG. 3A, the front frame 321 may be provided in a structure connected to the side housing 329. For example, the front frame 321 and the side housing 329 may be provided in an integral form, but are not necessarily limited thereto. The front frame 321 and the side housing 329 may also be provided as separate members.

The front frame 321 may be formed of, for example, a metal material and/or a non-metal material (e.g., polymer). The display 323 may be coupled to a front surface of the front frame 321 and the PCB 324 may be coupled to a rear surface of the front frame 321.

In the PCB 324, one or more components (e.g., a processor, a memory, and/or an interface) may be mounted. The processor may include, for example, one or more of a CPU, an AP, a GPU, an ISP, a sensor hub processor, or a CP. In the PCB 324, a board connector 324-1 for transmitting or receiving a signal from or to the antenna 327, and various electronic components 324-2 (e.g., a camera module) may be mounted.

The battery 325 may supply power to one or more components (e.g., the display 323, the PCB 324, and/or the antenna 327). For example, at least a portion of the battery 325 may be disposed on substantially the same plane as the PCB 324. The battery 325 may be disposed integrally inside the electronic device 320, or disposed detachably from the electronic device 320.

The rear frame 326 may be disposed behind the front frame 321. For example, electronic components may be fixed in the rear frame 326. For example, the rear frame 326 may be formed by injection molding. The rear frame 326 may also be referred to as a "rear injection molding product." For example, the rigidity of the rear frame 326 may be greater than the rigidity of the housings 322, 328, and 329. The rear frame 326 may form a space in which at least one electronic component (e.g., the board connector 324-1) is to be disposed, between the front frame 321 and the rear frame 326, together with the front frame 321. For example, a portion of the front frame 321 and a portion of the rear frame 326 may be in direct contact to form the space between the front frame 321 and the rear frame 326. For example, the rigidity of each of the front frame 321 and the rear frame 326 may be greater than that of the PCB 324, and the PCB 324 may be disposed between the front frame 321 and the rear frame 326. Such a rigid space may prevent or reduce transmission of an external impact to the PCB 324 that is relatively easily bent, and may thus prevent or reduce damage to the various electronic components (e.g., the board connector 324-2) inside the electronic device 320. For example, the rear frame 326 may be formed of a dielectric, and thus an area of at least a portion of the rear frame 326 may be used as a substrate of the antenna 327. The rear frame 326 may include a seating portion 326-2, a connecting hole 326-1, a through portion 326-3, a recessed portion 326-4, and a protruding portion 326-5.

The through portion 326-3, the recessed portion 326-4, and the protruding portion 326-5 may be structures provided to support or receive various electronic components or structures to be accommodated in the electronic device 320. For example, the one or more electronic components 324-2 (e.g., a camera module) installed in the PCB 324 may pass through the through portion 326-3 to be exposed to the rear housing 328. For example, the recessed portion 326-4 may provide a space for accommodating an electronic component (e.g., an antenna) mounted on an inner wall of the rear housing 328. For example, the protruding portion 326-5 may be of a shape that is tightly fit into a groove formed in the rear housing 328, thereby allowing the rear frame 326 and the rear housing 328 to be coupled to each other. For example, as illustrated, the protruding portion 326-5 and/or the recessed portion 326-4 may be formed on the front surface, in addition to the rear surface, of the rear frame 326. The protruding portion 326-5 and/or the recessed portion 326-4 may support another component (e.g., the PCB 324, the battery 325, and/or the rear housing 328) adjacent to the front surface and/or the rear surface of the rear frame 326 to prevent or reduce a relative movement of the component with respect to the rear frame 326. For example, the protruding portion 326-5 may be formed to function as a reinforcing rib for reinforcing the rigidity of the rear frame 326 itself, not for interfering with other components. As described above, the rear frame 326 may not have a simple planar shape, but may have the protruding portion 326-5, the recessed portion 326-4, and/or the through portion 326-3 that perform various functions.

Unlike this, the seating portion 326-2 on which the antenna 327 is seated, which is an area of the rear frame 326, may have, for example, a generally flat shape. For example, of the seating portion 326-2, an area overlapping the radiation portion 327-1 of the antenna 327 in the front-rear direction may be flat. Such a shape may allow the thickness of the seating portion 326-2 functioning as a dielectric to be constant, thereby improving the easiness of designing a pattern of the antenna 327.

The seating portion 326-2 may be a portion that is disposed between the radiation portion 327-1 and the ground portion 327-5 of the antenna 327, and be formed of a dielectric that causes an electric conduction behavior and function as a substrate of the antenna 327. For example, the seating portion 326-2 may be formed of polycarbonate or a synthetic material (e.g., PC+GF 30%) including polycarbonate and glass fiber. In addition to the seating portion 326-2, the rear frame 326 may all be formed of the same dielectric. Such a structure may enable injection molding of the rear frame 326 including the seating portion 326-2 integrally, and improve the easiness of manufacturing.

The seating portion 326-2 can have a first surface 326-2a and a second surface 326-2b. The ground portion 327-5 can be disposed on the first surface 326-2a of the seating portion 326-2. The radiation portion 327-1 of the antenna 327 can disposed on the second surface 326-2b of the seating portion 326-2.

For example, as illustrated in FIG. 3B, the seating portion 326-2 may have a shape that is more recessed compared to other adjacent areas of the rear frame 326, but is not necessarily limited thereto. For example, as illustrated in FIG. 3C, a seating portion 326-2' may not have a stepped portion with respect to an adjacent area of a rear frame 326'.

The connecting hole 326-1 may be disposed adjacent to the seating portion 326-2 and may pass through the rear frame 326 in the front-rear direction. Such a structure may allow the antenna 327 to be physically and electrically connected to the PCB 324 through the connecting hole 326-1, thereby feeding power from the PCB 324 to the antenna 327. For example, the connecting hole 326-1 may be disposed within 1 centimeter (cm) from the seating portion 326-2. For example, a step (e.g., stair) or a slope may be disposed between the connecting hole 326-1 and the seating portion 326-2.

Although the connecting hole 326-1 is illustrated as being formed inside the rear frame 326, the connecting hole 326-1 may have a shape recessed from a side surface of the rear frame 326. For example, the rear frame 326 may further include a cut portion that communicates with the outside in a lateral direction of the connecting hole 326-1. Such a structure may enable an installation of the antenna 327 in the rear frame 326 using a manufacturing method to be described later with reference to FIG. 5B.

The radiation portion 327-1 and the ground portion 327-5 can form a "sandwich" over the seating portion 326-2 of the rear frame 326 and a dielectric 327-3. That is, the ground portion 327-5 can disposed on a first surface of the seating portion 326-2a and a first surface of the dielectric 327-3, where the first surface of the seating portion 326-2a and the first surface of the dielectric 327-3 can be adjacent. The radiation portion 327-1 can included a first portion 327-11 that is disposed on the second surface of the seating portion 326-2b and a second portion 327-12 that is disposed on the second surface of the dielectric 327-3. The dielectric may be the same width, thinner, or thicker than the seating portion 326-2. The seating portion 326-2 can be stronger or more rigid than the dielectric 327-3.

Figure 5A:
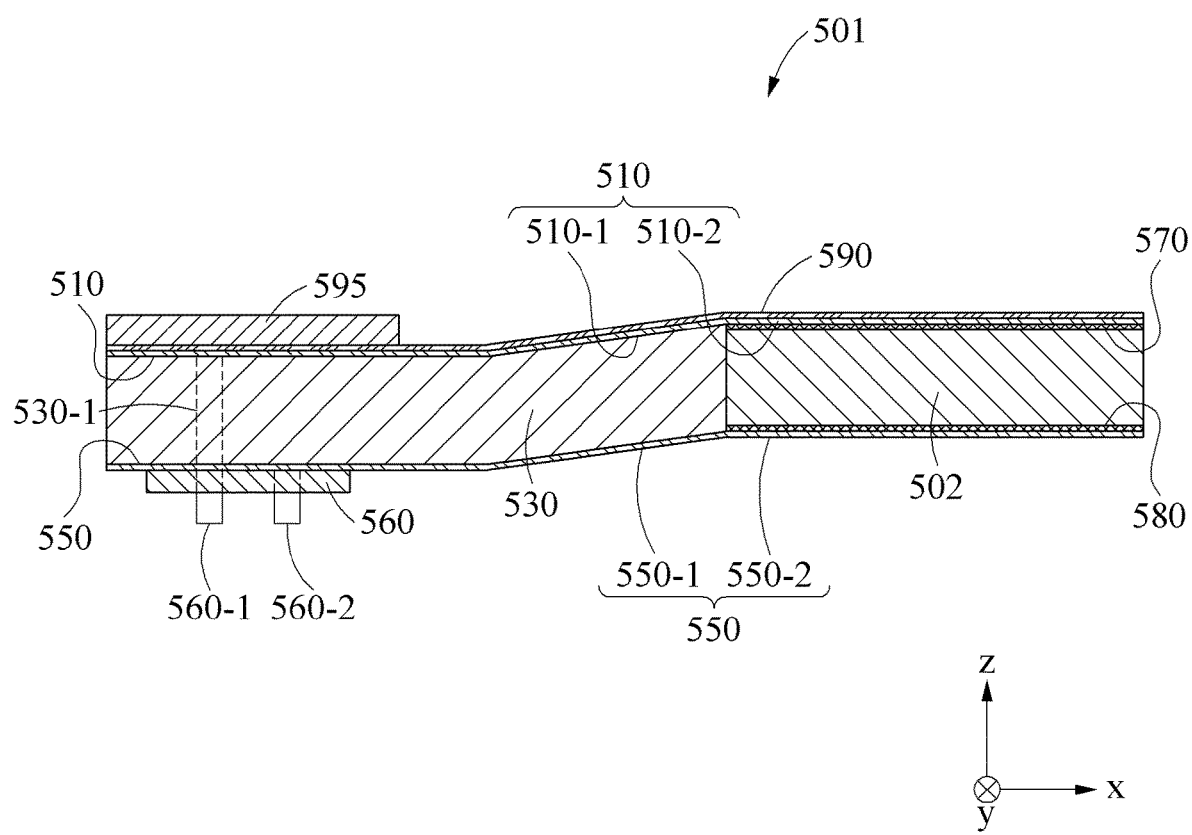
FIG. 5A is a cross-sectional view of a support structure and an antenna according to certain embodiments.
Figure 10A:
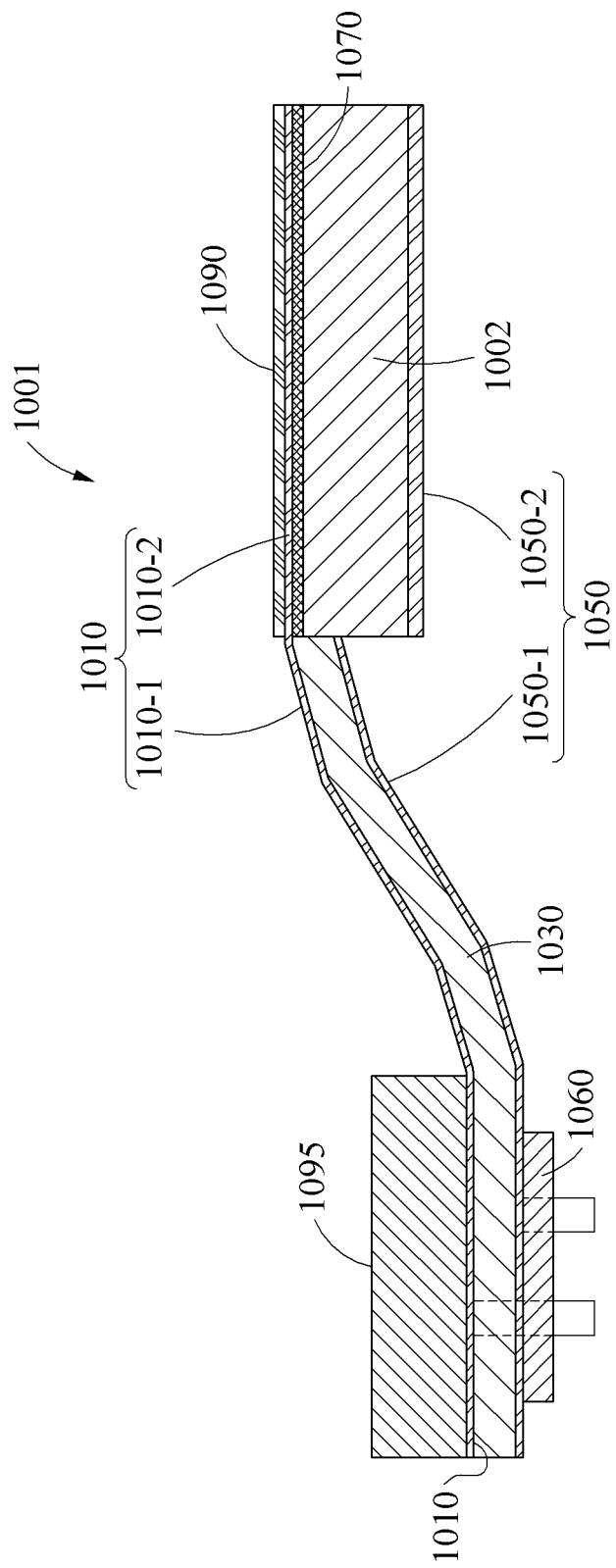
FIG. 10A is a cross-sectional view of a support structure and an antenna according to certain embodiments.

As illustrated in FIGS. 5A and 10A, a surface of at least a portion of an outer surface of a dielectric 327-3 of the antenna 327 may be disposed to face an inner wall of the connecting hole 326-1. For example, some of exposed surfaces of the dielectric 327-3 that are not covered by the radiation portion 327-1 and the ground portion 327-5 may be disposed to face the inner wall of the connecting hole 326-1. For example, the exposed surfaces described above may be in face-to-face contact with the inner wall of the connecting hole 326-1. For example, the dielectric 327-3 may be closely attached to an inner surface of the connecting hole 326-1 such that there is no gap between an outer surface of the dielectric 327-3 and the inner surface of the connecting hole 326-1. However, a fine gap may be generated between the outer surface of the dielectric 327-3 and the inner surface of the connecting hole 326-1 in a manufacturing process. For another example, the connecting hole 326-1 may be formed in a shape different from that illustrated in FIGS. 3A and 3B, for example, a triangle, a pentagon, a hexagon, a circle, and/or an oval. For example, a surface of at least a portion of the outer surface of the dielectric 327-3 of the antenna 327 may be disposed to face the inner wall of the connecting hole 326-1.

According to certain embodiments, the dielectric 327-3 of the antenna 327 may include polyimide. For example, the dielectric 327-3 of the antenna 327 may include modified polyimide (MPI).

The antenna 327 may be disposed between the rear housing 328 and the battery 325, for example. The antenna 327 may include, for example, an ultra-wide band (UWB) antenna, the MST antenna 297-1, the NFC antenna 297-3, and/or the wireless charging antenna 297-5. The antenna 327 may, for example, perform long-range or short-range communication with an external device, or wirelessly transmit and receive power required for charging. Hereinafter, the antenna 327 will be described as a UWB antenna as an example. However, unless otherwise stated, the following description is also applicable to other types of antennas. The UWB antenna may be an antenna having a high level of positioning accuracy with an error range of 10 cm or less by using a high frequency (3.1 to 10.6 gigahertz (GHz)) and having a level of security enhanced through a time of flight (ToF) method using a wide bandwidth of 500 megahertz (MHz). The UWB antenna may be used for, for example, access technology (e.g., security, car keys, and/or digital keys), location based services (LBS) (e.g., indoor navigation), people/asset tracking technology, mobile payment, and internet of things (IoT) devices. The positioning method using the UWB antenna may include, for example, a ToF measurement method, a time of arrival (ToA) measurement method, and/or an angle of arrival (AoA) measurement method. Although a case in which the antenna 327 uses the AoA measurement method will be described hereinafter as an example, another measurement method may also be used unless otherwise stated.

The antenna 327 may include the radiation portion 327-1 and the ground portion 327-5 respectively disposed on the first and second surfaces of the rear frame 326, and the dielectric 327-3 disposed between the radiation portion 327-1 and the ground portion 327-5.

The radiation portion 327-1 may be disposed on a first surface 326-2a of the seating portion 326-2, and the ground portion 327-5 may be disposed on a second surface 326-2b of the seating portion 326-2. For example, the antenna 327 may be disposed in the rear frame 326, not in the other support structures 321 and 324, and the radiation portion 327-1 may be disposed on the rear surface of the rear frame 326. Such a structure may prevent or reduce an interference in a signal radiated from the radiation portion 327-1 by an internal component (e.g., the display 323, the board connector 324-1, and/or the electronic components 324-2) including various conductive materials, thereby improving the radiation efficiency. Conversely, as illustrated in FIG. 3A, a component having a conductive material, for example, the electronic components 324-2, may be disposed in an area that overlaps the antenna 327 in the front-rear direction and is disposed opposite to the radiation portion 327-1. Thus, such a structure may improve a degree of freedom in designing internal components of the electronic device 320.

As illustrated in FIG. 3B, a first portion 327-11 of the radiation portion 327-1 may cover the dielectric 327-3, and a second portion 327-12 of the radiation portion 327-1 may cover a portion (e.g., the seating portion 326-2) of the rear frame 326. Similarly, a first portion of the ground portion 327-5 may cover the dielectric 327-3, and a second portion of the ground portion 327-5 may cover a portion (e.g., the seating portion 326-2) of the rear frame 326. Such a structure may considerably reduce the entire thickness of the antenna 327 by a thickness of a dielectric disposed on the rear surface of the rear frame 326 illustrated in FIG. 8 according to a comparative example (refer to FIG. 8). For example, it is also possible to considerably reduce the thickness of the electronic device 320 of a foldable type, the electronic device 320 of a rolling type, and/or the electronic device 320 of a sliding type, in addition to the electronic device 320 of a bar type that is illustrated herein as an example.

The radiation portion 327-1 may include a plurality of patch plates P1, P2, and P3 each being in the form of a patch. Using the patch plates P1, P2, and P3, a direction in which an electromagnetic source is located may be detected. For example, the direction in which the electromagnetic source is located may be detected by comparing magnitudes of signals received using the patch plates P1, P2, and P3 or by comparing phases of the signals received using the patch plates P1, P2, and P3. For example, through an AoA detecting method based on a phase difference between the signals received using the patch plates P1, P2, and P3, it is possible to detect the direction of the electromagnetic source with a high resolution, compared to the former method of comparing the magnitudes.

The patch plates P1, P2, and P3 may include, for example, three patch plates P1, P2, and P3 that are not disposed on a straight line. By the three patch plates P1, P2, and P3, both two components—a horizontally polarized wave which is a radio wave vibrating in a horizontal direction with respect to a traveling direction, and a vertically polarized wave which is a radio wave vibrating in a vertical direction with respect to the traveling direction—may be identified. Thus, by detecting an AoA, the antenna 327 may function as the UWB antenna that detects the direction of the electromagnetic source with a high resolution.

For example, the three patch plates P1, P2, and P3 may include a first patch plate P1 in the form of a patch disposed on the rear surface of the rear frame 326, a second patch plate P2 in the form of a patch that is spaced apart from the first patch plate P1 in a first direction (e.g., a +x-axis direction) on the rear surface of the rear frame 326, and a third patch plate P3 in the form of a patch that is spaced apart from the first patch plate P1 in a second direction (e.g., a +y-axis direction) on the rear surface of the rear frame 326. In this example, a center of the first patch plate P1, a center of the second patch plate P2, and a center of the third patch plate P3 may be installed so as not to be disposed on the straight line, and thus the two components—the horizontally polarized wave and the vertically polarized wave—may be identified. For example, the first direction (e.g., the +x-axis direction) and the second direction (e.g., the +y-axis direction) may be orthogonal to each other on the rear surface of the rear frame 326. For example, an angle formed between a first imaginary line connecting the center of the first patch plate P1 and the center of the second patch plate P2 and a second imaginary line connecting the center of the first patch plate P1 and the center of the third patch plate P3 may be 45 to 135 degrees (°). For example, the angle formed between the first imaginary line and the second imaginary line may be 90°. That is, the three patch plates P1, P2, and P3 may be disposed at positions corresponding to vertices of a right-angled triangle, on the rear surface of the rear frame 326. Such a structure may improve a detection function of the antenna 327 as the UWB antenna. Unless otherwise stated, the antenna 327 may also include two or less patch plates, or include four or more patch plates.

As illustrated in FIGS. 3A and 3B, the dielectric 327-3 may be disposed in a portion overlapping the board connector 324-1 when viewed in the front-rear direction. According to certain embodiments, when viewed in the front-rear direction, the dielectric 327-3 may be disposed at a position spaced apart from the second patch plate P2 in the second direction (e.g., the +y-axis direction) and spaced apart from the third patch plate P3 in the first direction (e.g., the +x-axis direction). By such a shape, the three patch plates P1, P2, and P3 and the dielectric 327-3 may roughly form an overall rectangular shape when viewed from the front-rear direction.

Figure 4A:
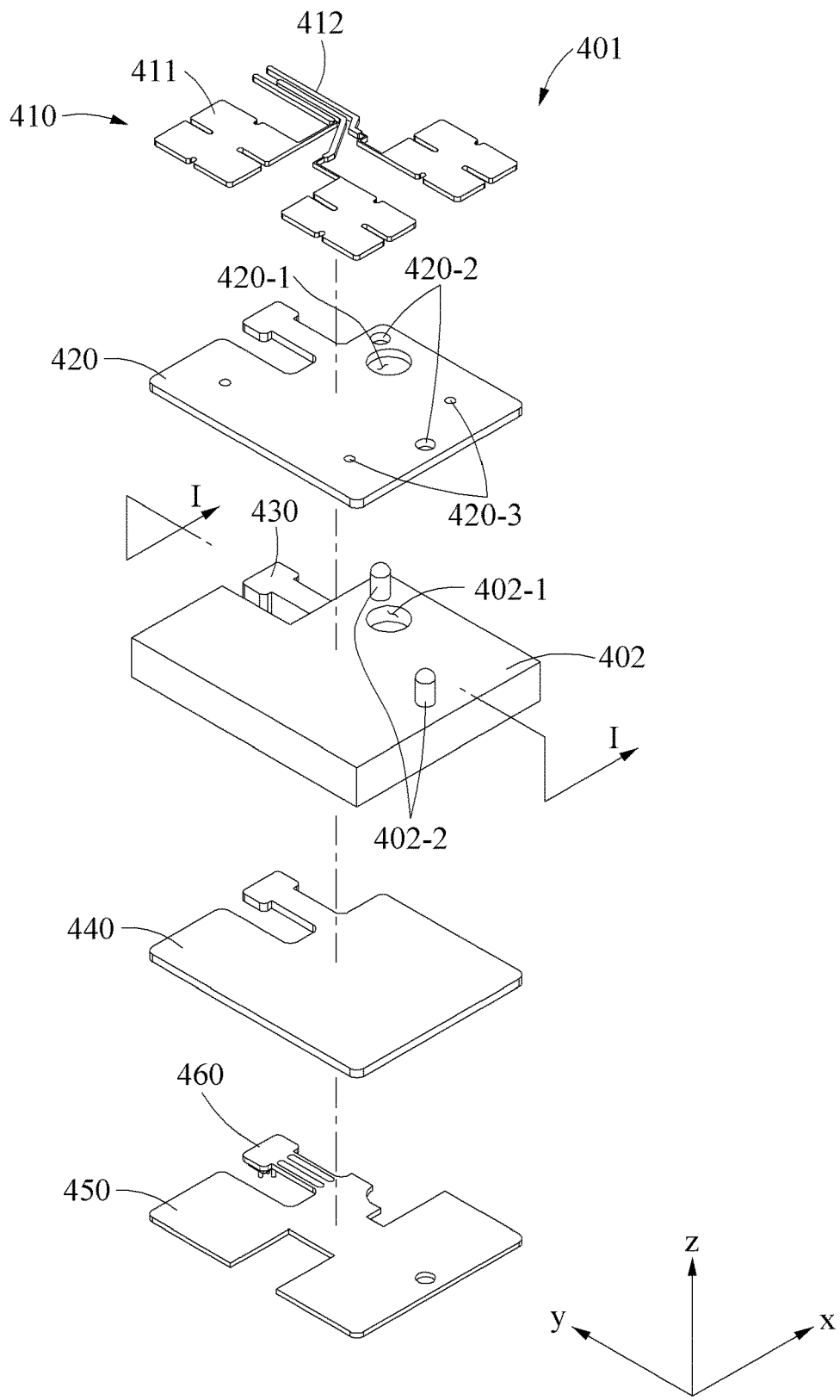
FIG. 4A is an exploded perspective view of a support structure and an antenna according to certain embodiments.
Figure 4B:
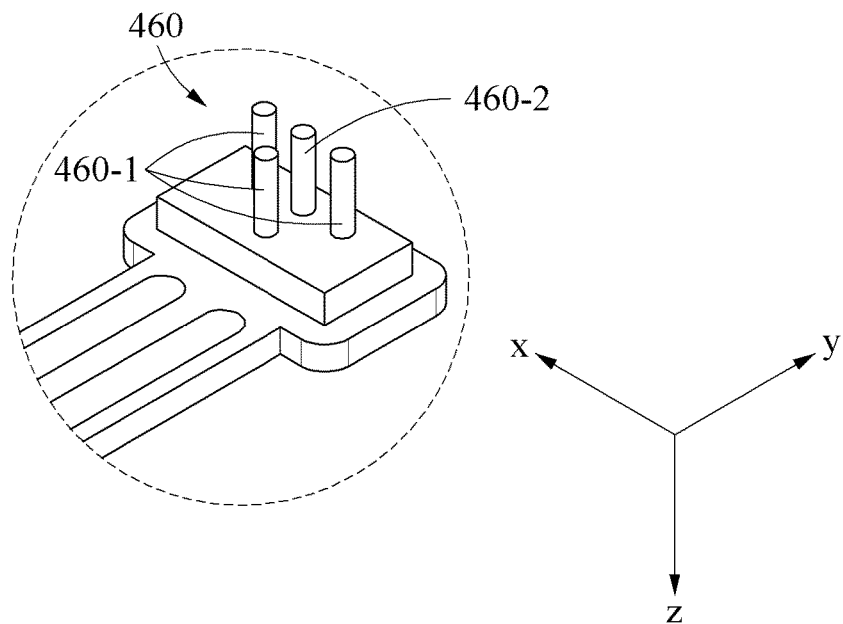
FIG. 4B is a perspective view of an antenna connector according to certain embodiments.

FIG. 4A is an exploded perspective view of a support structure and an antenna according to various example embodiments, and FIG. 4B is a perspective view of an antenna connector according to various example embodiments. The support structure 402 and the substrate 430 can abut each other via a side surface. The antenna includes patch plates 411 and signal lines 412. The patch plates 411 are disposed on the second surface of the support structure 402, while the signal lines are disposed on the substrate. The patch plates 411 can be considered part of the first portion of the radiation portion. The ground electrode 450 has an antenna connector 460 protruding therefrom. The ground electrode 450 can be disposed on first side of the support structure 402, while the antenna connector 460 is disposed on a first side of the dielectric 430.

Referring to FIGS. 4A and 4B, illustrated is a structure in which components of an antenna 401 (e.g., the antenna 327) are disposed on a support structure 402 (e.g., the rear frame 326 or the seating portion 326-2). The support structure 402 may generally have a flat shape, but may include a concavo-convex portion such as a fixing portion 402-1 and a guide protrusion 402-2 as illustrated as needed. However, even in the presence of the fixing portion 402-1 and the guide protrusion 402-2, an area of the support structure 402 that overlaps a radiation electrode 410 in a front-rear direction may have a flat shape without such a concavo-convex portion.

The support structure 402 may include a first surface (−z side) and a second surface (+z side). The antenna 401 may include the radiation electrode 410, a radiation-side base substrate 420, a dielectric 430, a ground-side base substrate 440, a ground electrode 450, and an antenna connector 460. The radiation electrode 410 and the radiation-side base substrate 420 may be collectively referred to herein as a "radiation portion" (e.g., the radiation portion 327-1), and the ground-side base substrate 440 and the ground electrode 450 may be collectively referred to herein as "a ground portion" (e.g., the ground portion 327-5). The radiation portion and the ground portion may not include a base substrate. The ground portion may be disposed on the first side of the support structure 401, while the radiation portion may be disposed on the second side of the support structure 401.

The radiation electrode 410 may include a patch plate 411 for radiating or emitting a signal, and a signal line 412 for feeding power to the patch plate 411 by being connected thereto through a via hole (e.g., a via hole 530-1) formed in the dielectric 430 from the antenna connector 460. For example, the patch plate 411 and the signal line 412 may each be provided in plural in number, forming a pair with each other. For example, the patch plate 411 and the signal line 412 may be installed entirely on the flat area of the support structure 402. For example, the fixing portion 402-1 and the guide protrusion 402-2 may be installed, avoiding the area where the patch plate 411 and the signal line 412 are installed.

The radiation-side base substrate 420 may be a medium disposed between the radiation electrode 410 and the support structure 402, and may allow the radiation electrode 410 to be maintained in its a predesigned shape in a disposition before the antenna 401 is attached to the electronic device 320. A first portion of the radiation-side base substrate 420 may cover the dielectric 430, and a second portion of the radiation-side base substrate 420 may cover the support structure 402. For example, the radial-side base substrate 420 may have a shape extending over a rear surface of the dielectric 430 and a rear surface of the support structure 402. For example, the radiation-side base substrate 420 may include a fixing hole 420-1, a guide hole 420-2, and a centering hole 420-3. For example, the radiation-side base substrate 420 may be in a shape of a thin film.

To the fixing hole 420-1, a fastening member (e.g., a screw bolt) may be fastened to stably fix the radiation portion (including the radiation electrode 410 and the radiation-side base substrate 420) to the support structure 402. For example, the fixing hole 420-1 may be disposed between the dielectric 430 and a patch plate 411 that is closest to the dielectric 430 such that three patch plates 411 and the dielectric 430 form a rectangular shape viewed from the front-rear direction and a path of the signal line 412 is not hindered. The fixing portion 402-1 may be formed at a position corresponding to the fixing hole 420-1 in the support structure 402, and the fastening member may be inserted into the fixing hole 420-1 and the fixing portion 402-1 to fix the radiation portion (including the radiation electrode 410 and the radiation-side base substrate 420) and the support structure 402 to each other.

Into the guide hole 420-2, the guide protrusion 402-2 protruding from the rear surface of the support structure 402 may be inserted such that the radiation portion (including 410 and 420) is disposed at an accurate position in the support structure 402.

The centering hole 420-3 may be construed as a mark indicating a portion where a center of the radiation electrode 410 needs to be disposed in order to guide an accurate position when the radiation electrode 410 is fixed on the radiation-side base substrate 420.

The dielectric 430 may be disposed to face a sidewall of the support structure 402. For example, some of exposed surfaces of the dielectric 430 that are not covered by the radiation portion (410 and 420) and the ground portion (440 and 450) may be disposed to face the sidewall of the support structure 402. For example, the exposed surfaces described above may be in face-to-face contact with the sidewall of the support structure 402.

The thickness of the dielectric 430 may be the same as the thickness of the support structure 402. For example, the thickness of the dielectric 430 may be 0.45 millimeters (mm). Applying a similar thickness to the dielectric 430 and the support structure 402 as described above may reduce a z-axis direction error.

The ground-side base substrate 440 may be a medium disposed between the ground electrode 450 and the support structure 402, and may allow the ground electrode 450 to be maintained in a predesigned shape in a disposition before the antenna 401 is attached to the electronic device 320. A first portion of the ground-side base substrate 440 may cover the dielectric 430, and a second portion of the ground-side base substrate 440 may cover the support structure 402. For example, the ground-side base substrate 440 may have a shape extending over the front surface of the dielectric 430 and the front surface of the support structure 402. For example, the ground-side base substrate 440 may be provided in a shape of a thin film.

The ground electrode 450 may have a larger area than the radiation electrode 410 such that the radiation electrode 410 is completely overlapped in the front-rear direction.

The antenna connector 460 may protrude forward from the ground electrode 450 and be coupled to the board connector 324-1 of the PCB 324. The antenna connector 460 may include a feeding terminal 460-1 electrically connected to the radiation electrode 410 and a ground terminal 460-2 electrically connected to the ground electrode 450. When the antenna connector 460 and the board connector 324-1 are coupled to each other, the feeding terminal 460-1 and the ground terminal 460-2 may be electrically connected to the board connector 324-1.

For example, the feeding terminal 460-1 may be connected to the signal line 412 through the via hole (e.g., the via hole 530-1) formed in the dielectric 430, and may thereby supply power and/or signals from the board connector 324-1 to the radiation electrode 410.

FIG. 5A is a cross-sectional view of a support structure and an antenna according to certain embodiments. FIG. 5A may be construed as schematically illustrating a cross-sectional view obtained by cutting, by an I-I line, the view of a support structure and an antenna assembled with each other as illustrated in FIG. 4A.

Referring to FIG. 5A, illustrated is a structure in which components of an antenna 501 (e.g., the antenna 401) are disposed in a support structure 502 (e.g., the support structure 402). The antenna 501 may include a radiation portion 510, a dielectric 530, a ground portion 550, an antenna connector 560, a radiation-side adhesive layer 570, a ground-side adhesive layer 580, a protective layer 590 and a stiffener 595.

The radiation portion 510 may include a first portion 510-1 overlapping the dielectric 530 in a front-rear direction (e.g., a z-axis direction) and a second portion 510-2 overlapping the support structure 502 in the front-rear direction. The first portion 510-1 and the second portion 510-2 may be integrated. Integration of the first portion 510-1 and the second portion 510-2 results in consistency compositional properties as compared to separate portions abutting each other. Moreover, integration results in consistency of operation and electric properties.

The ground portion 550 may include a first portion 550-1 overlapping the dielectric 530 in the front-rear direction and a second portion 550-2 overlapping the support structure 502 in the front-rear direction. The first portion 550-1 and the second portion 550-2 may be provided in an integral form.

The thickness of the dielectric 530 may be, for example, 90% to 110% of the thickness of the support structure 502 disposed between the radiation portion 510 and the ground portion 550. For example, the thickness of the dielectric 530 may be the same as the thickness of the support structure 502. Such a structure may facilitate the installation of the radiation portion 510 and the ground portion 550 on two different surfaces of the dielectric 530 and the support structure 502, respectively.

The permittivity of the dielectric 530 may be, for example, 90% to 110% of the permittivity of the support structure 502. For example, the permittivity of the dielectric 530 may be the same as the permittivity of the support structure 502.

When materials (e.g., the dielectric 530 and the support structure 502) disposed between the radiation portion 510 and the ground portion 550 are completely filled with homogeneous and flush dielectric materials, attenuation that may be caused by a loss of the dielectric materials may be relatively easily calculated from a propagation constant. Thus, such a structure may improve the easiness of designing an antenna configured to perform the desired performance.

For example, the strength of the dielectric 530 may be lower than the strength of the support structure 502. Such a configuration may enable the formation of a via hole 530-1 in the dielectric 530, instead of the support structure 502 that is relatively thick and has high strength. Thus, a feeding terminal 560-1 disposed to pass through the via hole 530-1 formed in the dielectric 530 may feed power from the antenna connector 560 to the radiation portion 510, and thus the overall easiness of manufacturing the antenna 501 may be improved.

For example, the rigidity of the dielectric 530 may be lower than the rigidity of the support structure 502. By such a configuration, the dielectric 530 that is relatively flexible may be deformed in a process of inserting the antenna connector 560 into the board connector 324-1 through the connecting hole 326-1, and thus assembling performed between the antenna connector 560 and the board connector 324-1 may be performed smoothly.

The antenna connector 560 may include the feeding terminal 560-1 (e.g., the feeding terminal 460-1) electrically connected to the first portion 510-1 of the radiation portion 510, and a ground terminal 560-2 (e.g., the ground terminal 460-2) electrically connected to the first portion 550-1 of the ground portion 550.

The radiation-side adhesive layer 570 may include an adhesive material for attaching the radiation portion 510 to a rear surface of the support structure 502, and be provided on an inner surface of the second portion 510-2 of the radiation portion 510. For example, the radiation-side adhesive layer 570 may include a release paper to prevent the adhesive material from being exposed to the outside. Such a structure may prevent the radiation-side adhesive layer 570 from being attached to the second portion 550-2 of the ground portion 550 in a process of transporting and/or storing the antenna 501 that is in a state before being assembled on the support structure 502.

The ground-side adhesive layer 580 may include an adhesive material for attaching the ground portion 550 to a front surface of the support structure 502, and be provided on an inner surface of the second portion 550-2 of the ground portion 550. For example, the ground-side adhesive layer 580 may include a release paper to prevent the adhesive material from being exposed to the outside.

The protective layer 590 may be disposed between the rear housing 328 and the radiation portion 510 and may have a flexible material. For example, the protective layer 590 may be a sponge. Using the protective layer 590 may prevent or reduce a scratch on an inner surface of the rear housing 328 occurring by an electrode of the radiation portion 510 even when the radiation portion 510 is closely attached to the rear housing 328 to reduce the overall thickness of the electronic device 320.

The stiffener 595 may be formed of a material having a greater rigidity than that of the dielectric 530, and be disposed on the radiation portion 510. The stiffener 595 may thus reinforce the rigidity of the dielectric 530 that is relatively less rigid. For example, the stiffener 595 may be installed in an area of the dielectric 530 overlapping the antenna connector 560 in the front-rear direction, thereby improving the assembling stability in a process of assembling the antenna connector 560 in the board connector 324-1. For example, the stiffener 595 may be disposed as being between the dielectric 530 and the rear housing 328, while in a state in which the electronic device 320 is fully assembled, thereby stably maintaining the position of the dielectric 530 and the stable connection between the antenna connector 560 and the board connector 324-1.

Figure 5B:
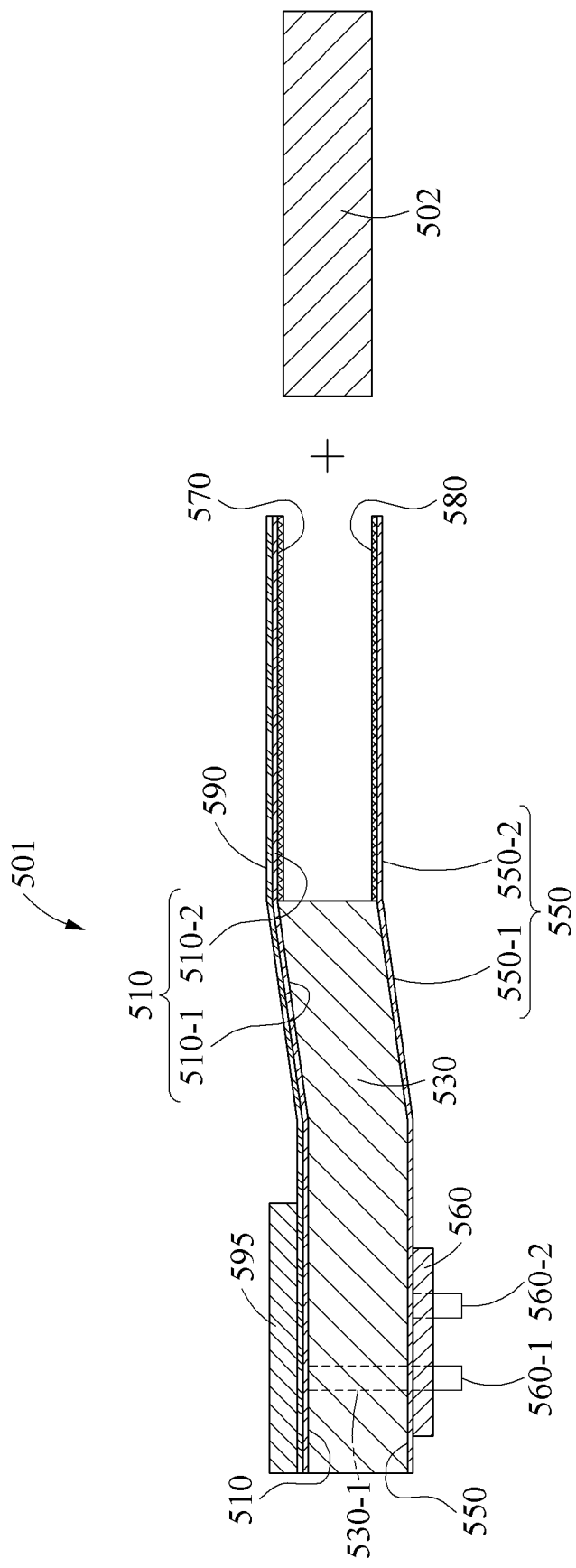
FIG. 5B is a diagram illustrating a method of manufacturing an electronic device including an antenna according to certain embodiments.

FIG. 5B is a diagram illustrating a method of manufacturing an electronic device including an antenna according to certain embodiments. The method includes providing a primary antenna 501 and a support structure 502. The primary antenna 501 can include a radiation side adhesive layer 570 and ground side adhesive layer 580 that extend from a dielectric 530. The radiation side adhesive layer 570 and the ground side adhesive layer 580 can receive the support structure 502.

Referring to FIG. 5B, an electronic device may be manufactured by installing the antenna 501 in the support structure 502. An antenna in a state before being installed in the support structure 502 may be referred to herein as a "primary antenna" 501, and the support structure 502 and the primary antenna 501 may be provided through separate processes. When the primary antenna 501 having the radiation portion 510 and the ground portion 550 is prepared first, the radiation portion 510 and the ground portion 550 of the primary antenna 501 may be installed respectively on two different surfaces of the support structure 502.

The support structure 502 may be provided by injection molding using, for example, polycarbonate or a synthetic material including polycarbonate. However, materials of the support structure 502 may not necessarily limited to the foregoing.

The providing of the primary antenna 501 may include a step of installing the radiation portion 510 and the ground portion 550 each having a larger area than the dielectric 530 on two different surfaces of the dielectric 530, respectively, a step of installing the radiation-side adhesive layer 570 having a release paper in a portion of the radiation portion 510 that does not contact the dielectric 530, and a step of installing the ground-side adhesive layer 580 having a release paper in a portion of the ground portion 550 that does not contact the dielectric 530.

The primary antenna 501 prepared through the foregoing steps may be installed in the support structure 502 by removing the release paper of the radiation portion 510 of the primary antenna 501 and removing the release paper of the ground portion 550 of the primary antenna 501, and then attaching them to the first surface and second surface of the support structure 502. For ease of manufacture, it may be possible to first remove any one of the release papers from both sides and attach it to one surface of the support structure 502, and then remove the other one and attach it to the other surface of the support structure 502.

Alternatively, it may also be possible to couple the antenna 501 when at least one of the adhesive layers 570 and 580 is provided in the support structure 502.

Figure 5C:
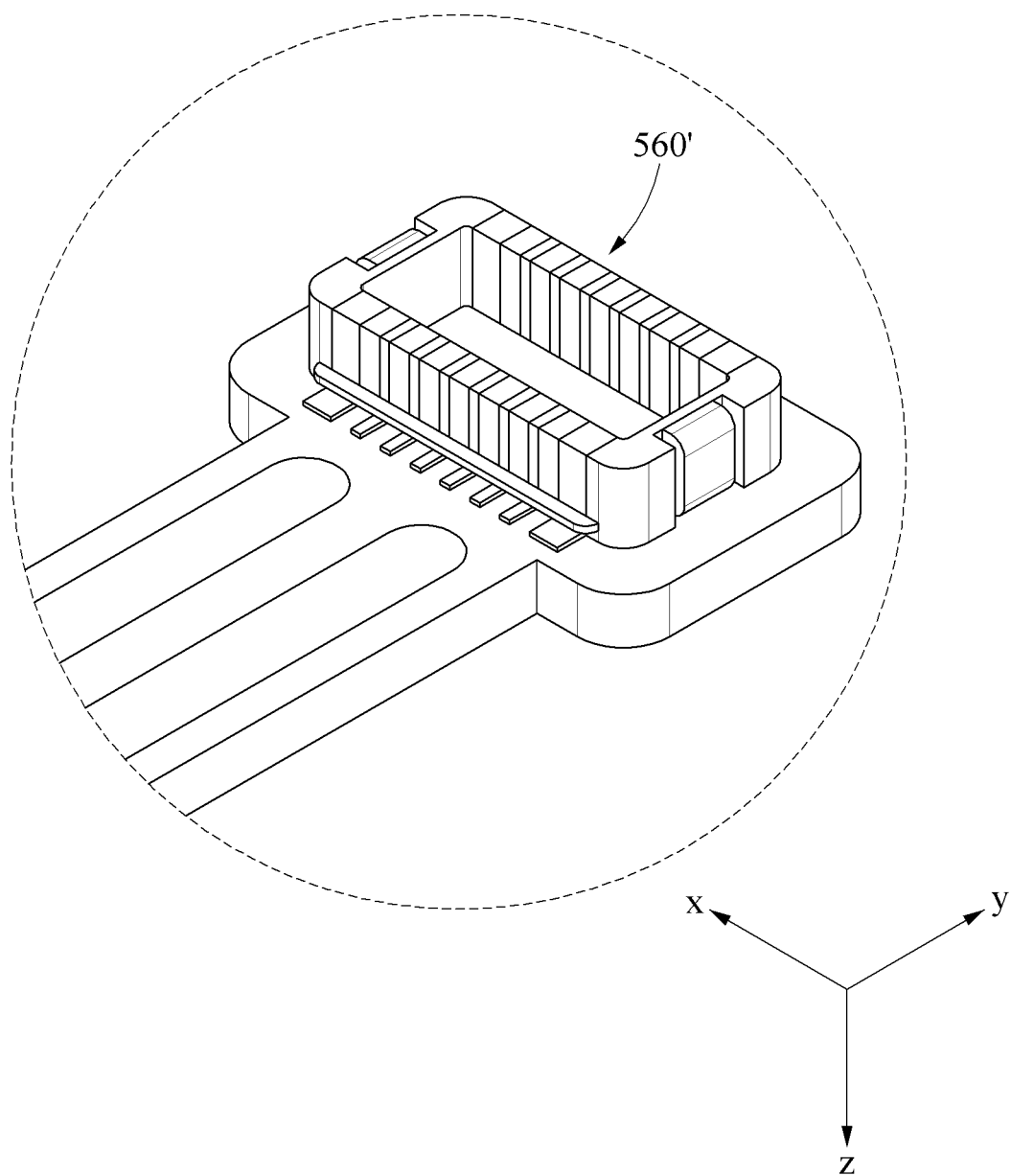
FIG. 5C is a perspective view of an antenna connector according to certain embodiments.

FIG. 5C is a perspective view of an antenna connector according to various example embodiments.

Referring to FIG. 5C, an antenna connector 560' (e.g., the antenna connector 460 or the antenna connector 560) may be provided in a form in which one or more terminals surround a fastening structure as illustrated.

Figure 6:
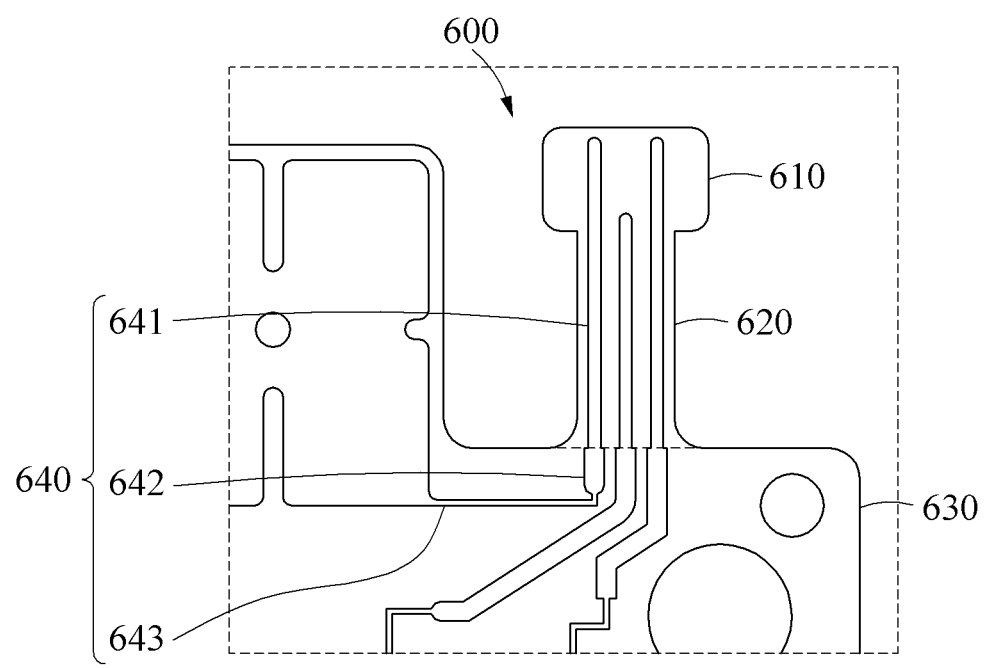
FIG. 6 is a partially enlarged view of an antenna viewed from a radiation portion side (rear) according to certain embodiments.
Figure 7:
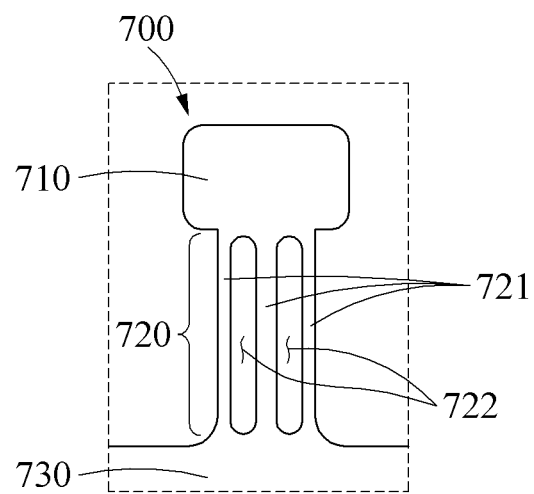
FIG. 7 is a partially enlarged view of an antenna viewed from a ground portion side (front) according to certain embodiments.

FIG. 6 is a partially enlarged view of an antenna viewed from a radiation portion side (rear) according to various example embodiments, and FIG. 7 is a partially enlarged view of an antenna viewed from a ground portion side (front) according to various example embodiments.

Referring to FIG. 6, according to certain embodiments, an antenna 600 may include a head 610, a neck 620, a body 630, a signal line 640, and a ground portion (opposite side, see FIG. 7, 700).

The head 610 may be a portion in which an antenna connector (e.g., the antenna connector 560) is disposed, and may include a via hole for supplying power or signals from the antenna connector to the signal line 640.

The neck 620 may be disposed between the head 610 and the body 630 and may have a width narrower than the width of the head 610 and/or the body 630.

In the body 630, a patch plate (e.g., the patch plate 411) of a radiation portion may be disposed. The body 630 may be a portion in which a support structure (e.g., the support structure 502) is disposed.

The signal line 640 may supply power or signals from the antenna connector to the radiation portion. For example, the signal line 640 may feed power from the head 610 to at least one patch plate disposed on the body 630 through the neck 620. The signal line 640 may include a first signal line 641 that is a portion disposed on a neck side and a second signal line 642 that is a portion disposed on a body side, based on a boundary (indicated by a dotted line in FIG. 6) between the neck 620 and the body 630, and include a third signal line 643 that is a portion connecting the second signal line 642 and the patch plate.

In addition, the neck 620 may be a portion in which a dielectric (e.g., the dielectric 530) is disposed The permittivity of the neck 620 may be lower than the permittivity of the body 630. In this case, the width of the first signal line 641 may be narrower than the width of the second signal line 642 in order to equalize signal losses that may occur due to a difference in permittivity. Such a design may further increase the flexibility of the neck 620, and improve the easiness of assembling performed between the antenna 600 and the substrate 324.

Alternatively, the permittivity of the neck 620 may be higher than the permittivity of the body 630. In this case, the width of the first signal line 641 may be wider than the width of the second signal line 642 in order to equalize signal losses that may occur due to a difference in permittivity.

The width of the first signal line 641 and the width of the second signal line 642 may be set based on the permittivity and thickness of the substrates respectively corresponding to the lines 641 and 642. However, these may change as a corresponding condition changes.

In addition, when conditions for an electrode pattern of the radiation portion, the permittivity of the neck 620, and the permittivity of the body 630 are changed, the widths of the second signal line 642 and the third signal line 643 may become different from each other. Unlike the foregoing, the widths of the second signal line 642 and the third signal line 643 may be the same.

Referring to FIG. 7, according to certain embodiments, a ground portion 700 (e.g., the ground portion 550) may include a ground head 710 disposed on the dielectric opposite of the head 610, a ground neck 720 disposed on dielectric opposite the neck 620, and a ground body 730 disposed on a first surface of a support structure opposite of the body 630.

The ground neck 720 may include a plurality of ground lines 721 connected to the antenna connector and overlapping the first signal line 641 in the front-rear direction, and at least one perforated portion 722 formed among the ground lines 721.

The perforated portion 722 may be elongated in a longitudinal direction without overlapping the first signal line 641 disposed on a rear surface of the neck 620 in the front-rear direction. Such a structure may allow the ground lines 721 to fully cover the first signal line 641 in the front-rear direction, and improve the bending flexibility of the ground neck 720 by a width by which the perforated portion 722 is formed, thereby improving the easiness of assembling performed between the antenna 600 and the substrate 324.

Figure 8:
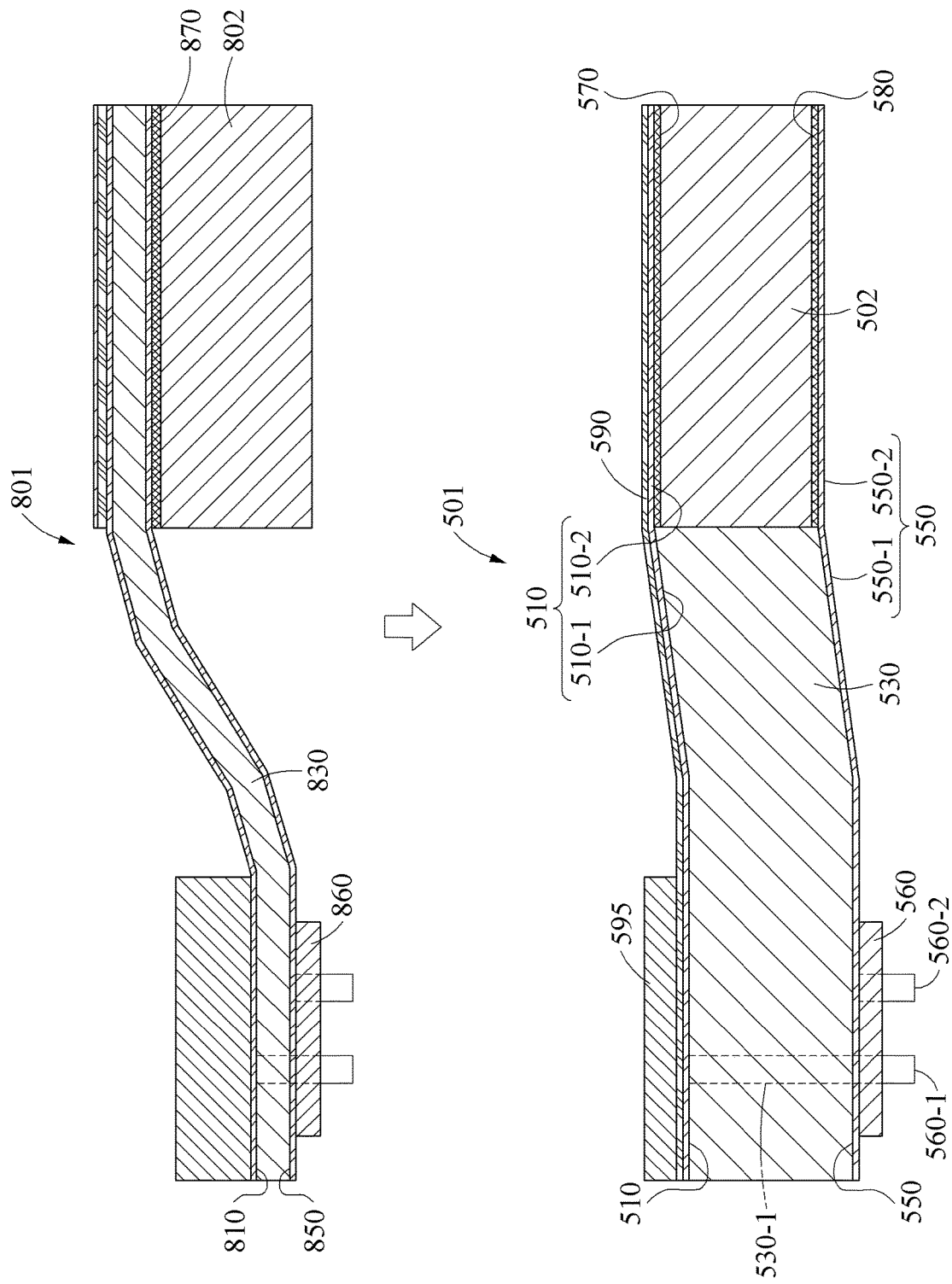
FIG. 8 is a cross-sectional view illustrating a comparison between a support structure and an antenna, and the support structure and the antenna of FIG. 5A, according to a comparative example embodiment.

FIG. 8 is a cross-sectional view illustrating a comparison between a support structure and an antenna, and the support structure and the antenna of FIG. 5A, according to a comparative example embodiment.

Referring to FIG. 8, illustrated above is a structure in which components of an antenna 801 are disposed on a support structure 802. The antenna 801 may be implemented as a flexible PCB (FPCB), and may include a radiation portion 810, a dielectric 830, a ground portion 850, an antenna connector 860, and an adhesive layer 870. The antenna 801 may be attached in a state in which layers including the radiation portion 810, the dielectric 830, and the ground portion 850 are all on the support structure 802, and thus the thickness of an electronic device may increase by the thickness of the dielectric 830 disposed on the support structure 802.

In contrast, in the case of the antenna 501 according to certain embodiments, using the support structure 502 as a dielectric may have an effect of removing one layer compared to the antenna 801 according to the comparative example embodiment. That is, the thickness corresponding to the thickness of the dielectric 830 stacked on the support structure 802 may be reduced, and it may thus be effective in reducing the weight and thickness of the electronic device.

Figure 9:
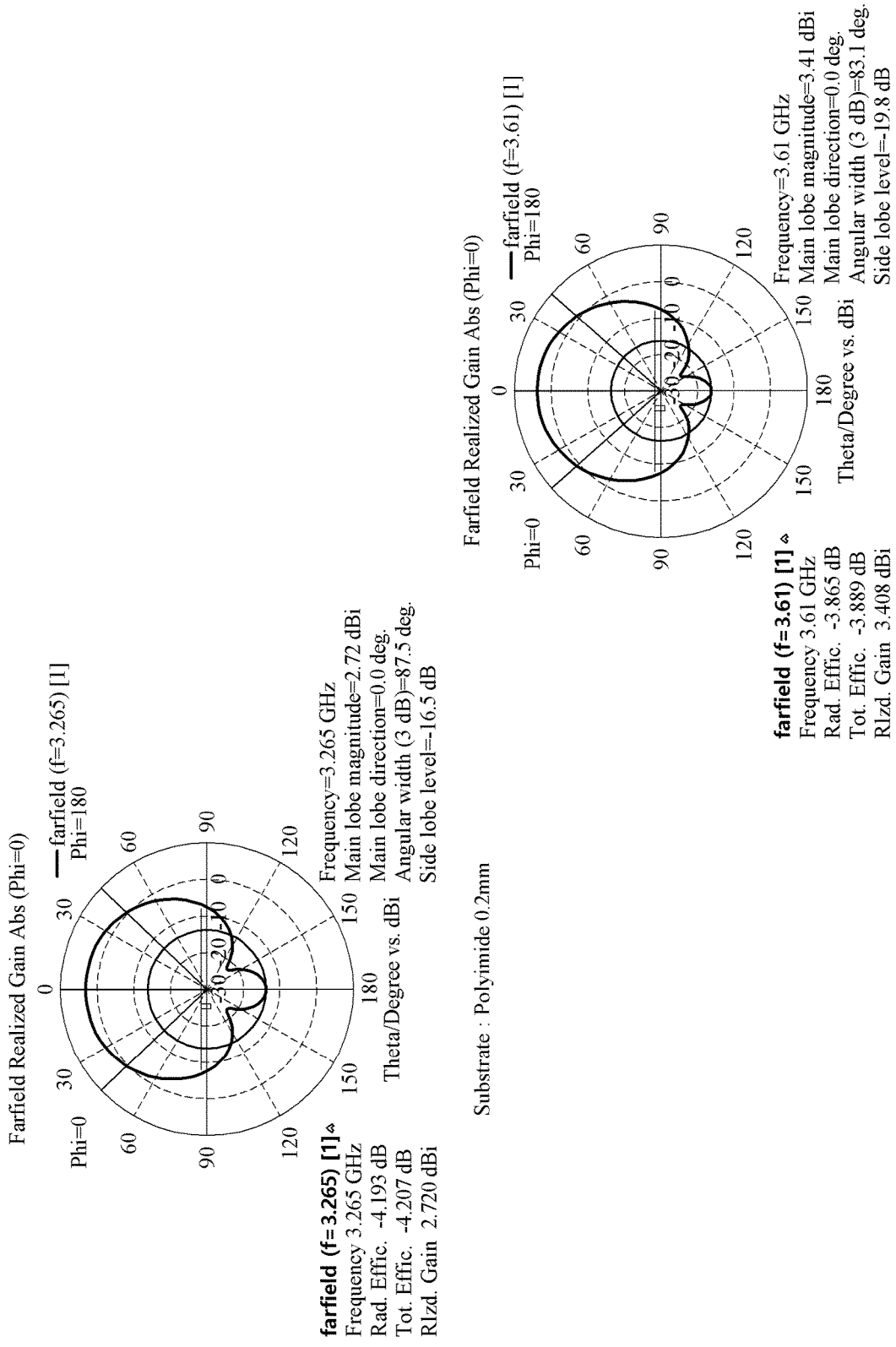
FIG. 9 is a diagram illustrating a radiation pattern and a gain of each of the antennas of FIGS. 8 and 5A.

FIG. 9 is a diagram illustrating a radiation pattern and a gain of each of the antennas illustrated in FIGS. 8 and 5A.

Referring to FIG. 9, a radiation pattern and gain of the antenna 801 illustrated in FIG. 8 and a radiation pattern and gain of the antenna 501 illustrated in FIG. 5A may be compared.

In consideration of a relationship between a gain and a frequency according to characteristics of a substrate, the gain may be generally known to decrease as the permittivity increases, and a material used for a rear frame of an electronic device may be generally known to have a high permittivity.

However, even though a member (e.g., a rear frame) having a higher permittivity is used as a substrate of the antenna, there may be an improved effect on the gain when the member is sufficiently thick. As results of calculation obtained using the thickness and material of a rear frame which is currently planned to be used, the structure of the antenna 501 of FIG. 5A may have the thickness lower than the thickness of the structure of the antenna 801 of FIG. 8 and have a higher effective gain, as indicated in Table 1 below.

TABLE 1

| Classification | Comparative example (FIG. 8) | Example (FIG. 5A) |
| --- | --- | --- |
| Material of substrate | polyimide | polycarbonate |
| Permittivity of substrate | 2.90 | 3.95 |
| Thickness of substrate | 0.2 mm | 0.4 mm |
| Effective gain | 2.720 dBi | 3.408 dBi |

FIG. 10A is a cross-sectional view of a support structure and an antenna according to certain embodiments. Here the dielectric 1030 is adjacent to the support structure 1002, but has a different thickness.

Referring to FIG. 10A, illustrated is a structure in which components of an antenna 1001 (e.g., the antenna 401) are disposed in a support structure 1002 (e.g., the support structure 402). According to certain embodiments, the antenna 1001 may include a radiation portion 1010, a dielectric 1030, a ground portion 1050, an antenna connector 1060, a radiation-side adhesive layer 1070, a protective layer 1090, and a stiffener 1095.

The radiation portion 1010 may include a first portion 1010-1 overlapping the dielectric 1030 in a front-rear direction and a second portion 1010-2 overlapping the support structure 1002 in the front-rear direction. The first portion 1010-1 and the second portion 1010-2 may be provided in an integral form.

The ground portion 1050 may include a first ground portion 1050-1 overlapping the dielectric 1030 in the front-rear direction and a second ground portion 1050-2 overlapping the support structure 1002 in the front-rearing direction.

The first ground portion 1050-1 may be disposed on a front surface of the dielectric 1030. For example, an area of each of the first ground portion 1050-1 and the dielectric 1030 may be smaller than an area of the connecting hole 326-1. When the antenna 1001 with the second ground portion 1050-2 excluded is referred to as a "primary antenna" and the primary antenna is prepared in advance, such a foregoing structure may allow the first ground portion 1050-1 to pass through the support structure 1002 to be connected to the PCB 324 by an operation of inserting the primary antenna from the rear of the support structure 1002 (e.g., the rear frame 326). For example, in a process of installing the radiation portion 1010 on the support structure 1002, it may not be necessary to simultaneously perform the operation on two different surfaces of the support structure 1002, and the assembling efficiency may thus be improved.

The second ground portion 1050-2 may be disposed on a front surface of the support structure 1002 (e.g., the seating portion 326-2). The second ground portion 1050-2 may be a component separate from the first ground portion 10501-1 and be disposed so as not to contact the first ground portion 1050-1. For example, rather than being connected to the antenna connector 1060, the second ground portion 1050-2 may be grounded through a floating ground method or grounded on the PCB 324 through a separate connecting member (e.g., a C clip). The floating ground method may refer to a floating ground that is present without a connection to an electrical ground. The foregoing method of grounding on the PCB 324 using the floating ground method or the separate connecting member (e.g., the C clip) may also be applied to the first ground portion 1050-1 or the first portion 550-1 and/or the second portion 550-2 of the ground portion 550 described above with reference to FIG. 5A.

The second ground portion 1050-2 may be formed using, for example, a laser direct structuring (LDS) method that engraves a conductor circuit on the surface of the support structure 1002 using a laser and then plates it. For example, the LDS method may be performed by processing a pattern on a thermoplastic resin (e.g., a plastic injection product) using a laser and performing a plating process. Alternatively, other methods, for example, a fusion method that punches out a desired pattern with a metal piece and then thermally fuses it into a body, an etching method that plates an entire molded article and removes a remainder while leaving only a pattern, a double injection method that plates only a pattern of a molded body, a printing direct structuring (PDS) method that prints a molded body directly with conductive ink and then plates it, and/or a method of forming a fixing protrusion on a case, fixing a wire antenna radiator having a certain length and pattern, and then electrically connecting the wire radiator and a substrate of a portable terminal through a separate ground member may be used. When the second ground portion 1050-2 is formed using the foregoing example methods, the second ground portion 1050-2 may not need a base substrate or an adhesive layer, and a ground electrode may be installed directly on the support structure 1002. Thus, the thickness of the entire product may be reduced.

The thickness of the dielectric 1030 may be sufficiently smaller than the thickness of the support structure 1002. For example, the thickness of the dielectric 1030 may be less than half the thickness of the support structure 1002. Such a structure may improve the flexibility of a neck and improve the easiness of assembling performed between the antenna 1001 and the PCB 324. However, it is noted that the thickness of the antenna 1001 is no thicker than the thickness of the support structure 1002.

The radiation-side adhesive layer 1070 may include an adhesive material for attaching the radiation portion 1010 to a rear surface of the support structure 1002, and be provided on an inner surface of the second portion 1010-2 of the radiation portion 1010. For example, the radiation-side adhesive layer 1070 may include a release paper to prevent the adhesive material from being exposed to the outside. Such a structure may prevent the radiation-side adhesive layer 1070 from being attached to other components in a process of transporting and/or storing the antenna 1001 in a state before being assembled in the support structure 1002.

Figure 10B:
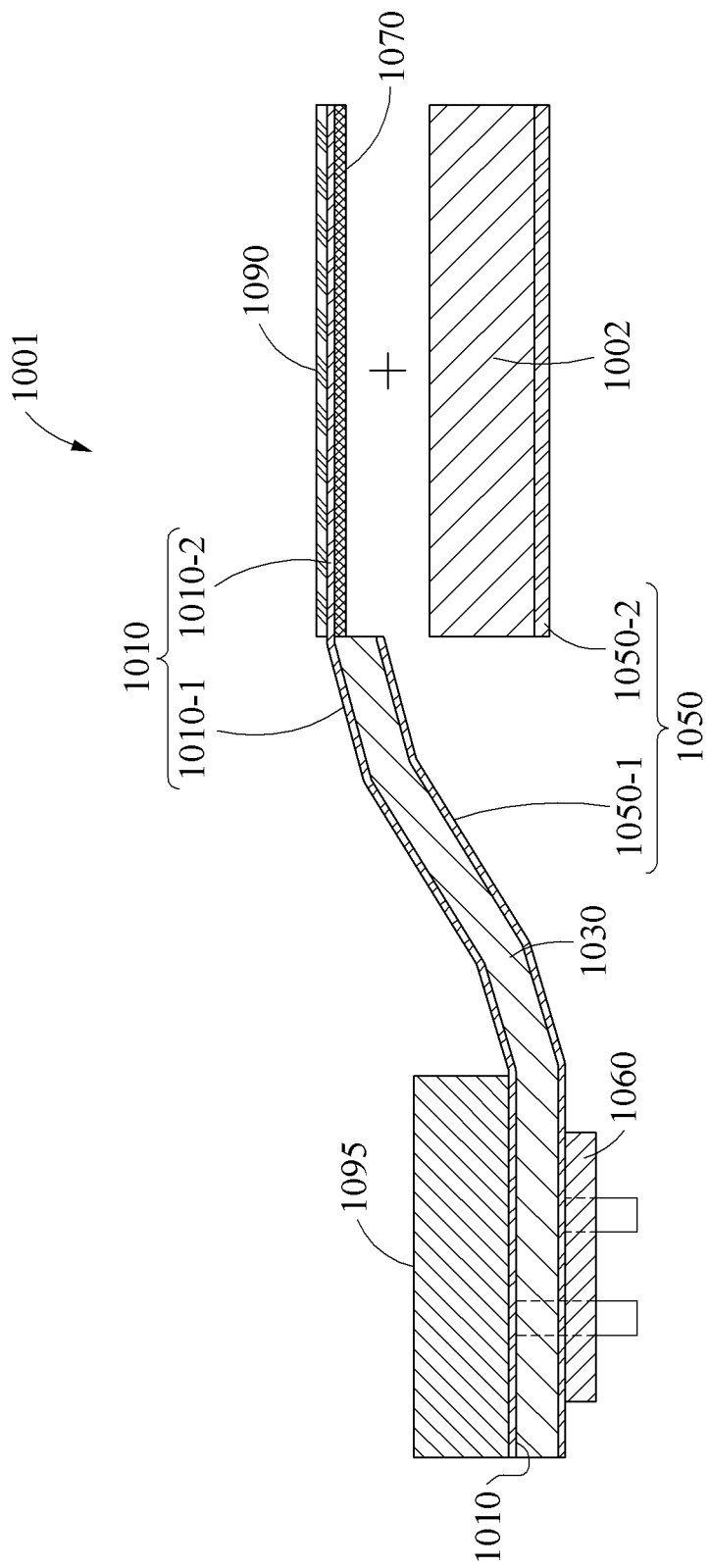
FIG. 10B is a diagram illustrating a method of manufacturing an electronic device including an antenna according to certain embodiments.

FIG. 10B is a diagram illustrating a method of manufacturing the antenna of FIG. 10A, according certain embodiments.

Referring to FIG. 10B, an electronic device may be manufactured by installing the antenna 1001 in the support structure 1002. When the antenna 1001 before being installed on the support structure 1002, that is, the antenna 1001 with the second ground portion 1050-2 excluded, is referred to as a "primary antenna," the support structure 1002 and the primary antenna may be provided through separate processes. When the primary antenna is provided first as described above, the radiation portion 1010 of the primary antenna may be installed on the support structure 1002.

The providing of the primary antenna may include a step of installing the radiation portion 1010 having a larger area than the dielectric 1030 on one surface of the dielectric 1030, a step of installing the first ground portion 1050-1 on the other surface of the dielectric 1030, and a step of installing the radiation-side adhesive layer 1070 having a release paper in a portion 1010-2 of the radiation portion 1010 that does not contact the dielectric 1030.

The radiation structure 1010 of the primary antenna (e.g., the antenna 1001) provided through the foregoing steps may be installed on the support structure 1002 by removing a release paper on a radiation portion side and then attaching the radiation-side adhesive layer 1070 to one surface of the support structure 1002.

The second ground portion 1050-2 of the antenna 1001 may be installed on the other surface of the support structure 1002. For example, the installing of the second ground portion 1050-2 may be performed before the installing of the radiation portion 1010 on the support structure 1002. Using this manufacturing process, it is possible to reduce a risk of damage to the radiation portion 1010 that may occur in a process of installing the second ground portion 1050-2 and install the second ground portion 1050-2 on the support structure 1002 by selecting a method from more diverse methods.

It is apparent to one of ordinary skill in the art that the antenna structure and the electronic device including the same according to certain embodiments of the disclosure as described above are not limited to the above-described embodiments and those shown in the drawings, and various changes, modifications, or alterations may be made thereto without departing from the scope of the disclosure.

What is claimed is:
1. An electronic device, comprising:
a display configured to output visual information to a front of the electronic device;
a support structure configured to support at least one of electronic components accommodated in the electronic device, the support structure having a first surface and a second surface, and a side surface between the first surface and the second surface;
an antenna comprising a ground portion disposed on the first surface and a radiation portion disposed on the second surface of the support structure; and a dielectric disposed between the ground portion and the radiation portion, the dielectric having a side surface abutting the side surface of the support structure.

2. The electronic device of claim 1, further comprising:
a rear housing configured to surround a rear outer surface of the electronic device,
wherein the support structure comprises:
a printed circuit board (PCB) configured to support the at least one electronic component; and
a rear frame disposed between the PCB and the rear housing,
wherein the radiation portion comprises at least one patch plate disposed on a rear surface of the rear frame, the second surface comprising the rear surface of the rear frame, and
the ground portion comprises at least one ground electrode disposed on a front surface of the rear frame and overlapping the at least one patch plate in a front-rear direction, the first surface comprising the front surface of the rear frame.

3. The electronic device of claim 2, wherein the dielectric is non-overlapping with the at least one patch plate in the front-rear direction.

4. The electronic device of claim 1, wherein the ground portion is disposed on a front surface of a rear frame disposed at a rearmost position of the support structure based on a front-rear direction crossing the front and the rear of the electronic device, the first surface comprising the front surface of the rear frame,
wherein the radiation portion is disposed on a rear surface of the rear frame, the second surface comprising the rear surface of the rear frame.

5. The electronic device of claim 1, wherein the support structure comprises:
a front frame configured to support the display; and
a rear frame disposed behind the front frame,
wherein the ground portion is disposed on a front surface of the rear frame, the first surface comprising the front surface of the rear frame, and the radiation portion is disposed on a rear surface of the rear frame, the second surface comprising the rear surface of the rear frame.

6. The electronic device of claim 5, wherein the antenna further comprises:
wherein a first portion of the radiation portion covers the dielectric, and a second portion of the radiation portion is configured to cover a portion of the rear frame.

7. The electronic device of claim 6, wherein a permittivity of the dielectric is less than that of the rear frame, and a strength of the rear frame is greater than that of the dielectric.

8. The electronic device of claim 5, wherein, between the front frame and the rear frame, a space in which the at least one electronic component is to be disposed is formed,
wherein the at least one electronic component overlaps the antenna in a front-rear direction and is disposed opposite to the radiation portion.

9. The electronic device of claim 5, wherein the rear frame comprises:
a protruding portion and/or a recessed portion configured to support another component adjacent to the front surface or the rear surface of the rear frame restricting a relative movement of the other component with respect to the rear frame; and
a seating portion on which the antenna is seated,
wherein, of the seating portion, an area overlapping the radiation portion of the antenna in a front-rear direction is flat.

10. The electronic device of claim 9, wherein the antenna further comprises:
wherein the radiation portion comprises:
a first portion overlapping the dielectric in the front-rear direction; and
a second portion overlapping the seating portion in the front-rear direction,
wherein the first portion and the second portion of the radiation portion are integrated.

11. The electronic device of claim 10, further comprising:
a PCB disposed between the front frame and the rear frame, on which the at least one electronic component is mounted,
wherein the rear frame further comprises:
a connecting hole disposed adjacent to the seating portion and configured to pass through the rear frame in the front-rear direction,
wherein the antenna is physically and electrically connected to the PCB through the connecting hole.

12. The electronic device of claim 11, wherein a surface of at least a portion of an outer surface of the dielectric faces an inner wall of the connecting hole.

13. The electronic device of claim 11, wherein the antenna comprises:
a head in which an antenna connector connected to the PCB is disposed;
a body in which a patch plate of the radiation portion is disposed; and
a neck disposed between the head and the body and having a width less than that of the body.

14. The electronic device of claim 4, wherein the radiation portion comprises:
a first patch plate disposed on the rear surface of the rear frame;
a second patch plate spaced apart from the first patch plate in a first direction, on the rear surface of the rear frame; and
a third patch plate spaced apart from the first patch plate in a second direction, on the rear surface of the rear frame,
wherein a center of the first patch plate, a center of the second patch plate, and a center of the third patch plate are not disposed on a straight line.

15. The electronic device of claim 10, wherein a first portion of the ground portion is configured to cover the dielectric, and a second portion of the ground portion is configured to cover a portion of the seating portion,
wherein the first portion and the second portion of the ground portion are provided in an integral form.

16. The electronic device of claim 10, wherein the ground portion comprises:
a first ground portion disposed on a front surface of the dielectric; and
a second ground portion disposed on a front surface of the seating portion without being in contact with the first ground portion.

17. A method of manufacturing an electronic device comprising a support structure having a first surface and a second surface, and a side surface between the first surface and the second surface, the support structure configured to support at least one of electronic components accommodated in the electronic device and an antenna comprising a ground portion and a radiation portion, the method comprising:

installing a dielectric having a side surface, such that the side surface of the dielectric abuts the side surface of the support structure;

installing the ground portion on the first surface of the support structure and a first surface of the dielectric; and installing the radiation portion on the second surface of the support structure and a second surface of the dielectric.

18. An electronic device, comprising:

a housing defining an exterior of the electronic device;

a display configured to output visual information to the front of the electronic device;

a support structure configured to support at least one of electronic components accommodated in the electronic device;

an antenna disposed inside the housing and configured to use at least a portion of the support structure as a substrate; and a dielectric disposed between a ground portion and a radiation portion of the antenna, wherein the dielectric has a side surface that abuts a side surface of the support structure.

19. The method of claim 17, further comprising:

providing a primary antenna before the installing of the radiation portion on the second surface of the support structure and the installing of the ground portion on the first surface of the support structure, wherein the providing of the primary antenna comprises:

installing the ground portion having a larger area than the dielectric on a first surface of the dielectric, and radiation portion on a second surface of the dielectric;

installing an adhesive layer having a release paper in a portion of the radiation portion that is not in contact with the dielectric; and installing an adhesive layer having a release paper in a portion of the ground portion that is not in contact with the dielectric.

20. The method of claim 17, further comprising:

providing a primary antenna before the installing of the radiation portion on the second surface of the support structure and the installing of the ground portion on the first surface of the support structure, wherein the ground portion comprises a first ground portion and a second ground portion that are not in contact with each other, wherein the providing of the primary antenna comprises:

installing the first ground portion on a first surface of the dielectric;

installing the radiation portion having a larger area than the dielectric on a second surface of the dielectric; and installing an adhesive layer having a release paper in a second portion of the radiation portion that is not in contact with the dielectric, wherein the installing of the ground portion on the first surface of the support structure comprises:

installing the second ground portion on the first surface of the support structure, wherein the installing of the second ground portion is performed before the installing of the radiation portion.

* * * * *